United States Patent
Ishikawa et al.

(10) Patent No.: US 6,526,516 B1
(45) Date of Patent: *Feb. 25, 2003

(54) POWER CONTROL SYSTEM AND METHOD FOR DISTRIBUTION OF POWER TO PERIPHERAL DEVICES

(75) Inventors: Hisashi Ishikawa, Urayasu (JP); Hiroshi Tajika, Yokohama (JP); Miyuki Fujita, Tokyo (JP); Yuji Konno, Kawasaki (JP); Hiroo Inoue, Kawasaki (JP); Kenji Takahashi, Kawasaki (JP); Norihiro Kawatoko, Machida (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,255

(22) Filed: Dec. 11, 1998

(30) Foreign Application Priority Data

Dec. 17, 1997 (JP) ............................................. 9-348303
Sep. 11, 1998 (JP) ........................................... 10-258683

(51) Int. Cl.⁷ ................................................ G06F 1/00
(52) U.S. Cl. ....................................... 713/340; 713/330
(58) Field of Search ................................ 713/310, 320, 713/323, 328, 330, 240; 710/62–64, 72–74

(56) References Cited

U.S. PATENT DOCUMENTS

| | | | |
|---|---|---|---|
| 4,862,012 A | | 8/1989 | Mardon .......................... 307/38 |
| 5,483,656 A | * | 1/1996 | Oprescu et al. .............. 713/300 |
| 5,560,022 A | * | 9/1996 | Dunstan et al. .............. 713/300 |
| 5,630,204 A | | 5/1997 | Hylton et al. ................. 455/3.3 |
| 5,652,893 A | * | 7/1997 | Ben-Meir et al. ............ 713/300 |
| 5,675,811 A | * | 10/1997 | Broedner et al. ............ 713/300 |
| 5,675,813 A | * | 10/1997 | Holmdahl ..................... 713/300 |
| 5,919,264 A | * | 7/1999 | Reneris ....................... 713/324 |
| 5,933,656 A | * | 8/1999 | Hansen .......................... 710/62 |
| 5,964,879 A | * | 10/1999 | Dusntan et al. ............. 713/340 |
| 6,211,581 B1 | * | 4/2001 | Farrant ........................ 307/117 |
| 6,301,674 B1 | * | 10/2001 | Saito et al. .................. 713/340 |

FOREIGN PATENT DOCUMENTS

| | | | |
|---|---|---|---|
| CA | 2088989 | 12/1992 | ............ H02J/13/00 |
| EP | 0862313 A2 | 9/1998 | ............ H04N/1/00 |

OTHER PUBLICATIONS

Canadian Office Action from corresponding Canadian Patent Application (2,256,024) dated Apr. 23, 2002.
Canadian Office Action from corresponding Canadian Patent Application (2,256,024) dated May 5, 2000.
Official Communication in corresponding European Patent Application (98123827.2–2212) dated Jan. 31, 2001, including European Search Report.

* cited by examiner

*Primary Examiner*—Peter Wong
*Assistant Examiner*—Raymond N Phan
(74) *Attorney, Agent, or Firm*—Morgan & Finnegan, L.L.P.

(57) ABSTRACT

In a system to which a plurality of devices are connected, each device has heretofore required a connector for an AC adapter and a connector for a signal line. Further, in order to arrange it so that the amount of power supplied to the overall system will not exceed a limit value, it has been required to adjust the amount of power during system use by turning the power source of each device on or off. According to the present invention, a signal line for data transfer and a power line for supply of power in a system connecting a plurality of devices are consolidated in a single cable to make it possible to connect both lines to one connector of each device. The power controller of a certain device acquires the properties of a plurality of devices connected to this device, decides the optimum power distribution and controls the power controllers of each of the other devices.

66 Claims, 34 Drawing Sheets

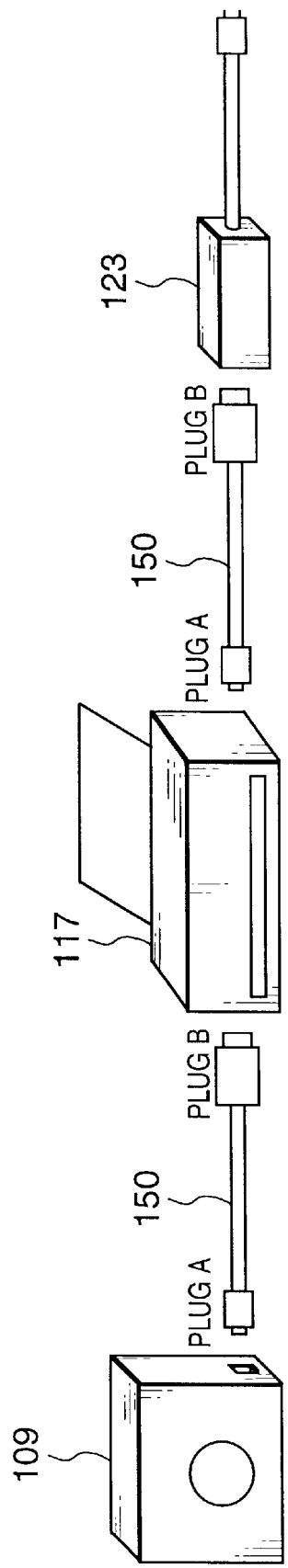

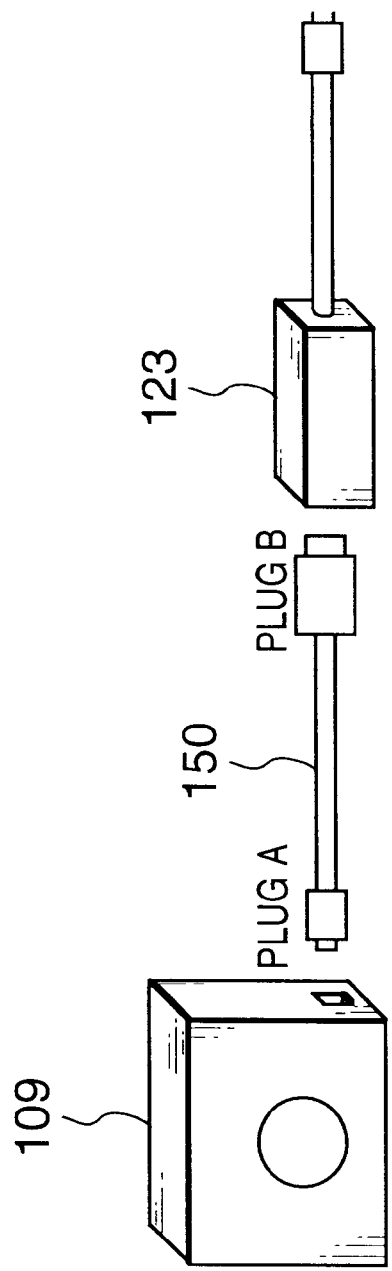

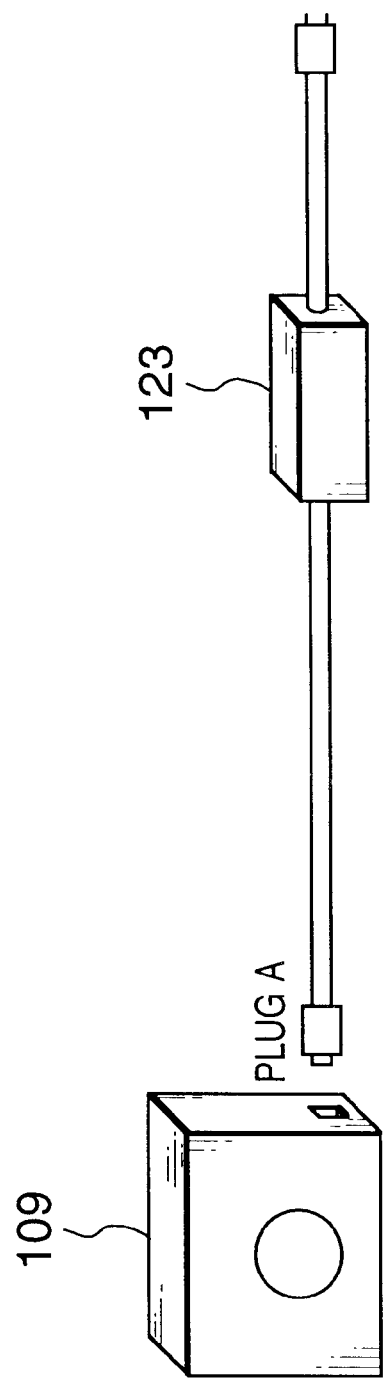

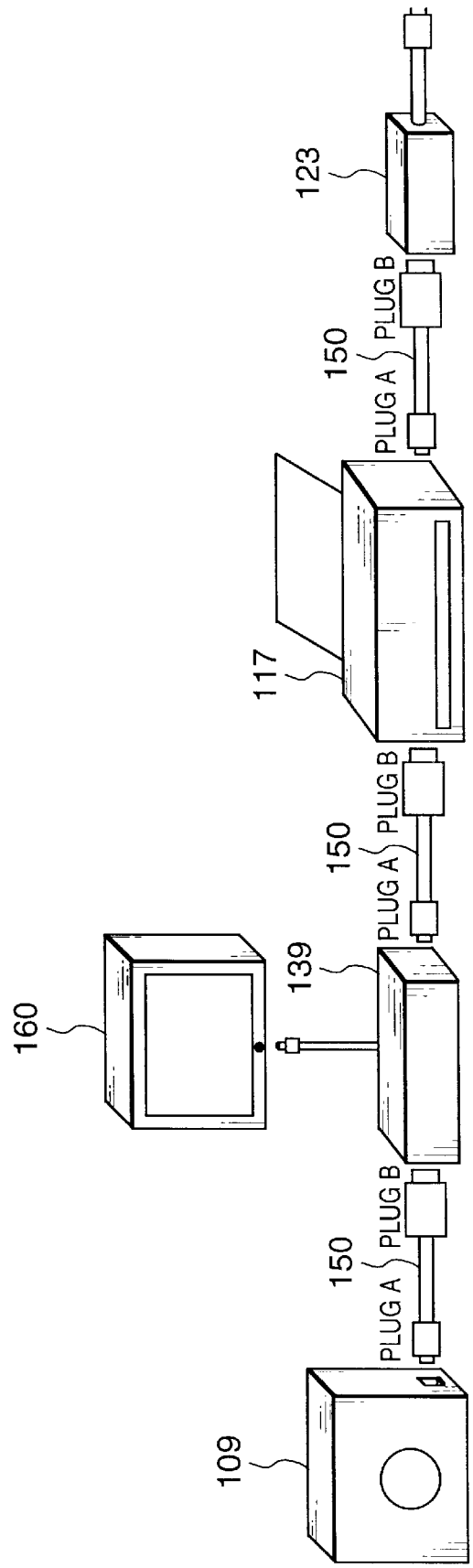

CLOCK : EXCLUSIVE-OR SIGNAL BETWEEN DATA AND STROBE

BRANCH : NODE WITH TWO OR MORE NODE CONNECTIONS

LEAF : NODE WITH SINGLE PORT CONNECTION

□ : PORT
c : PORT CORRESPONDING TO CHILD NODE
p : PORT CORRESPONDING TO PARENT NODE

FIG. 25
CSR CORE REGISTER

| OFFSET (hexadecimal) | REGISTER NAME | FUNCTION |
|---|---|---|
| 000 | STATE_CLEAR | INFORMATION ON STATUS AND CONTROL |
| 004 | STATE_SET | INFORMATION ON WRITE ENABLE/DISABLE STATUS OF STATE_CLEAR |
| 008 | NODE_IDS | BUS ID + NODE ID |
| 00C | RESET_START | TO RESET BUS BY WRITING INTO THIS AREA |
| 010~014 | INDIRECT_ADDRESS, INDIRECT_DATA | REGISTER TO ACCESS ROM AREA GREATER THAN 1KB |
| 018~01C | SPLIT_TIMEOUT | TIMER VALUE TO DETECT TIME-OUT OF SPLIT TRANSACTION |
| 020~02C | ARGUMENT, TEST_START, TEST_STATUS | REGISTER FOR DIAGNOSIS |
| 030~04C | UNITS_BASE, UNITS_BOUND, MEMORY_BASE, MEMORY_BOUND | NOT INSTALLED IN IEEE 1394 |
| 050~054 | INTERRUPT_TARGET, INTERRUPT_MASK | REGISTER OF INTERRUPTION NOTIFICATION |
| 058~07C | CLOCK_VALUE, CLOCK_TICK_PERIOD, CLOCK_STOROBE_ARRIVED, CLOCK_INFO | NOT INSTALLED IN IEEE 1394 |
| 080~0FC | MESSAGE_REQUEST, MESSAGE_RESPONSE | REGISTER FOR MESSAGE NOTIFICATION |
| 100~17C | | RESERVATION |
| 180~1FC | ERROR_LOG_BUFFER | TO RESERVE FOR IEEE 1394 |

F I G. 26
SERIAL BUS REGISTER

| OFFSET (hexadecimal) | REGISTER NAME | FUNCTION |
|---|---|---|
| 200 | CYCLE_TIME | COUNTER FOR ISOCHRONOUS TRANSFER |
| 204 | BUS_TIME | REGISTER FOR TIME SYNCHRONIZATION |
| 208 | POWER_FAIL_IMMINENT | REGISTER RELATING TO POWER SUPPLY |
| 20C | POWER_SOURCE | |
| 210 | BUSY_TIMEOUT | TO CONTROL RETRY IN TRANSACTION LAYER |
| 214~218 | | RESERVATION |
| 21C | BUS_MANAGER_ID | NODE ID OF BUS MANAGER |
| 220 | BANDWIDTH_AVAILABLE | TO MANAGE ISOCHRONOUS TRANSFER BAND |
| 224~228 | CHANNELS_AVAILABLE | TO MANAGE CHANNEL NUMBER FOR ISOCHRONOUS TRANSFER |
| 22C | MAINT_CONTROL | REGISTER FOR DIAGNOSIS |
| 230 | MAINT_UTILITY | |
| 234~3FC | | RESERVATION |

FIG. 27

SERIAL-BUS NODE RESOURCE REGISTER

| OFFSET (hexadecimal) | REGISTER NAME | FUNCTION |
|---|---|---|
| 800~FFC | | RESERVATION |
| 1000~13FC | TOPOLOGY-MAP | INFORMATION ON SERIAL BUS STRUCTURE |
| 1400~1FFC | | RESERVATION |
| 2000~2FFC | SPEED-MAP | INFORMATION ON TRANSFER SPEED OF SERIAL BUS |
| 3000~FFFC | | RESERVATION |

FIG. 28

MINIMUM FORMAT CONFIGURATION ROM

| 01 | VENDOR ID |
|---|---|

FIG. 29

GENERAL FORMAT CONFIGURATION ROM

| LENGTH OF bus_info_block | LENGTH OF ROM | CRC |
|---|---|---|
| bus_info_block (ASCII CODE OF 1394 BUS AND INFORMATION ON WHETHER OR NOT NODE HAS CAPABILITIES OF ISOCHRONOUS RESOURCE MANAGEMENT, CYCLE MASTER, AND BUS MANAGEMENT) | | |
| root_directory (INDICATE VENDOR ID AND NODE FUNCTION) | | |
| unit_directories (INDICATE UNIT TYPE AND DRIVER SOFT VERSION) | | |
| root & unit_leaves | | |
| vendor_dependent_information | | |

ISOCHRONOUS DATA PACKET

FIG. 34

| ABBREVIATION | NAME | CONTENT |
| --- | --- | --- |
| destination_ID | destination identifier | ID OF DESTINATION NODE (ASYNCHRONOUS ONLY) |
| tl | transaction label | LABEL INDICATING A SERIES OF TRANSACTIONS (ASYNCHRONOUS ONLY) |
| rt | retry code | CODE INDICATING RETRANSMISSION STATUS (ASYNCHRONOUS ONLY) |
| tcode | transaction code | CODE INDICATING PACKET TYPE (ASYNCHRONOUS ONLY) |
| pri | priority | PRIORITY ORDER (ASYNCHRONOUS ONLY) |
| source_ID | source identifier | SOURCE NODE (ASYNCHRONOUS ONLY) |
| destination_offset | destination memory address | MEMORY ADDRESS OF DESTINATION NODE (ASYNCHRONOUS ONLY) |
| rcode | response code | RESPONSE STATUS (ASYNCHRONOUS ONLY) |
| quadiet_data | quadiet(4bytes) data | 4-BYTE LENGTH DATA (ASYNCHRONOUS ONLY) |
| data_length | length of data | LENGTH OF data_field (EXCEPT pad bytes) |
| extended_tcode | extended transaction code | EXTENDED TRANSACTION CODE (ASYNCHRONOUS ONLY) |
| chanel | isochronous identifier | IDENTIFICATION OF ISOCHRONOUS PACKET |
| sy | synchronization code | SYNCHRONIZATION OF VIDEO IMAGE AND AUDIO INFORMATION |
| cycle_time_data | contents of the CYCLE_TIME register | CYCLE TIMER REGISTER VALUE OF CYCLE MASTER NODE (CYCLE PACKET ONLY) |
| data_field | data + pad bytes | DATA STORAGE (ISOCHRONOUS AND ASYNCHRONOUS) |
| header_CRC | CRC for header field | CRC FOR HEADER |
| data_CRC | CRC for data field | CRC FOR DATA |
| tag | tag label | ISOCHRONOUS PACKET FORMAT |

POWER CONTROL SYSTEM AND METHOD FOR DISTRIBUTION OF POWER TO PERIPHERAL DEVICES

BACKGROUND OF THE INVENTION

This invention relates to a power control system and method for supplying power to a system to which a plurality of devices are connected.

A printer generally is connected to a personal computer serving as a host device via a Centronics interface for parallel data transmission or RS-232C interface for serial data transmission.

Items of digital equipment serving as image display devices such as scanners, digital still cameras and digital video cameras may also be connected to a personal computer. The image data input by each item of digital equipment is temporarily loaded onto a hard disk or the like of the personal computer and is subsequently converted to print data for the printer by being processed as by application software running on the personal computer. The print data is sent to the printer via the above-mentioned interface.

The widespread use of digital equipment such as digital cameras has been accompanied by the development of techniques that make it possible to handle this digital equipment more conveniently. One example of such a known technique is to directly connect a digital camera and printer together and output the image captured by the digital camera to the printer directly. In accordance with this technique, an image captured by the digital camera can be printed out without the intervention of a personal computer.

Accordingly, the use of digital equipment, a prime example of which is the digital camera, is fostered even among users who do not possess a personal computer.

In a system that implements direct output of this kind (referred to as a "direct printing system"), connecting an editor to the system instead of a personal computer makes it possible edit and combine images through a simple operation.

In such a direct printing system, electric power is supplied to the devices (digital camera, printer, etc.) that construct the system. In general, 100V AC power supplied by a power company is used as the power source.

In domestic indoor wiring, the peak supplied power is controlled by the breaker of a power board. A power board usually has a two-stage construction, namely a breaker of a main power source and breakers for respective ones of a plurality of power channels. The breaker of each power channel limits the usable current in accordance with the current rating of the wiring, and the breaker of the main power source limits the maximum current, which is based upon an agreement with the power company.

Accordingly, each device constituting the direct printing system is connected to an AC power source supplied via a breaker, as a result of which stabilized supply of power is assured at all times.

In the example of the prior art described above, however, an AC adapter connected to the AC power source to supply power is required to be connected to each of the connected devices, namely to the digital camera, editor and printer. Cables serving as signal lines connecting the devices together so that data may be transferred among them also are necessary. Consequently, the operation for making the connections to construct the system is troublesome and complicated.

In addition, a plurality of connectors for the AC adapters and signal lines are required for both the digital camera and editor. Thus, the prior art involves a number of problems not only in terms of user convenience but also in regard to the space required for the connectors of each device and the cost of making the connections.

Further, in regard to the breaker that limits the peak of ordinary AC power, whether or not to break the current path is a decision made based upon the amount of current that actually flows through the wiring. Consequently, it is required that each of the terminal devices (inclusive of the digital camera and printer, etc.) that actually use the supplied power be controlled individually by the user in such a manner that the above-mentioned limitation is satisfied. In other words, in order that the breaker will not interrupt the supply of power to the corresponding power channel, the amount of power presently being used must be adjusted manually as by turning on and off the power sources (i.e., the power switches) of household appliances, etc., being used in this power channel.

A method that has been considered in order to maintain the supply of power without limiting the use of the terminal devices involves updating the agreement with the power company for the contracted current in conformity with the peak current used. However, this is undesirable in view of economy and conservation.of power.

In particular, though average power consumption tends to decrease as electrical appliances that employ inverter techniques increase, the increase in peak current is conspicuous. More specifically, increasing the contracted current in order to assure peak current for very short periods of time or compelling the user to connect terminal devices to the power sources of separate channels detracts greatly from economy and user convenience.

Further, owing to the increased number of functions with which modern electrical appliances are provided, there tend to be more items (time, etc.) that need to be initially set at the time of installation. Since even standby power supplied to each device is interrupted by the tripping of a breaker, it is necessary for the user to make the initial setting of each device again when such an interruption occurs. In addition, depending upon how the terminal devices, which are not limited to digital cameras and printers but can also include medical equipment, are being used, the effects of an interruption in the supply of power can be serious.

Furthermore, since equipment for supplying power must be provided to deal with peak currents that last for very short periods of time, an increase in such peak current is accompanied by the necessity to provide more of such equipment. This not only leads to much higher cost but also lowers energy efficiency when power is generated. The latter is attended by deleterious consequences for the environment.

SUMMARY OF THE INVENTION

Accordingly, it is an object of the present invention to provide a power control system and method through which the signal-line connector of each of a plurality of devices connected into a system can be integrated with the power-supply connector of the device to make possible the use of a single, common cable.

According to the present invention, the foregoing object is attained by providing a power control system to which a plurality of devices are connected by connecting means for transferring data and supplying power, comprising: power-source connecting means for connecting a prescribed device among the plurality of devices to a power source; and power control means for supplying power from the prescribed device to the other devices, which are connected via the connecting means, in accordance with a power distribution that is based upon power information in the plurality of devices.

As a result, it is easier to connect devices together and it becomes possible to reduce the space required for the connectors of the devices as well as the cost of making the connections.

It is another object of the present invention to provide a power control system and method through which effective distribution of power is performed among a plurality of devices by dynamically controlling the supply of power on a line.

According to the present invention, the foregoing object is attained by providing a power control system for supplying power to a plurality of devices interconnected on a power source line, comprising: distribution deciding means for deciding distribution of power to each of the plurality of devices based upon power information in each device; and mode control means for controlling a power consumption mode of each device in accordance with the distribution of power decided by the distribution deciding means.

As a result, it is possible to distribute power effectively among a plurality of devices.

The invention is particularly advantageous since devices can be connected together more easily, connector space for each device can be reduced and costs can be lowered through use of a common cable achieved by integrating the signal-line connector of each of the devices with the power-supply connector of each device.

Further, effective distribution of power is performed among a plurality of devices by dynamically controlling the supply of power on a line.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram showing an example of a mode of connection between devices;

FIG. 3 is a diagram showing an example of a mode of connection between devices;

FIG. 4 is a diagram showing an example of a mode of connection between devices;

FIG. 6 is a diagram showing an example of a mode of connection between devices in the second embodiment;

FIG. 25 is a table showing functions of a CSR architecture of the 1394 serial bus;

FIG. 26 is a table showing registers for the 1394 serial bus;

FIG. 27 is a table showing registers for node resources of the 1394 serial bus;

FIG. 28 is an example of a minimum format of a configuration ROM of the 1394 serial bus;

FIG. 29 is an example of a general format of the configuration ROM of the 1394 serial bus;

FIG. 34 is a table showing the details of packet format fields for the isochronous transfer in a 1394 serial bus.

DESCRIPTION OF THE PREFERRED EMBODIMENTS

Preferred embodiments of the present invention will now be described in detail in accordance with the accompanying drawings.

FIRST EMBODIMENT

This embodiment will be described in regard to an example of a system in which an image sensing device and an image output device are directly connected and receive power supplied from the side of the image output device.

Figure 1:
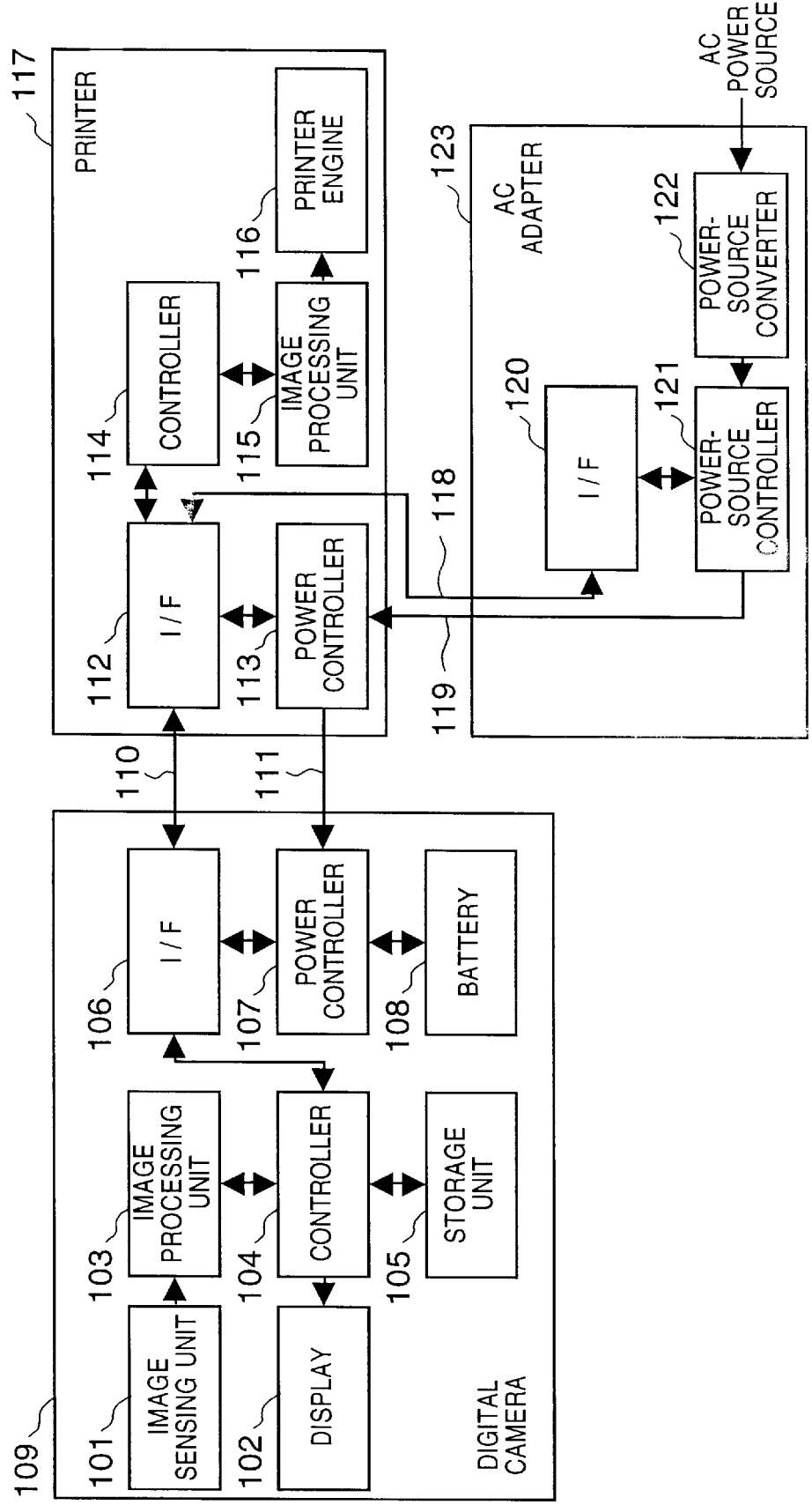
FIG. 1 is a block diagram illustrating the configuration of an power control system in a first embodiment of the present invention.

FIG. 1 is a block diagram showing the configuration of an power control system according to this embodiment. The system includes a digital camera 109 serving as the image sensing device, a printer 117 serving as the image output device, and an AC adapter 123 serving as an external power source device.

This embodiment is characterized in that each device has a data interface (I/F) for performing a data transfer and a power controller for controlling power, and the supplied power is controlled by controlling the power controller of each device via its data interface. Further, the embodiment is characterized in that a single common cable is used for a signal line interconnecting the data interfaces of the devices and a power line interconnecting the power controllers of the devices.

The digital camera 109 in FIG. 1 obtains an image signal by a CCD in an image sensing unit 101. The signal thus obtained by imaging is subjected to color image processing such as color conversion processing and filtering processing in an image processing unit 103, whereby the signal is converted to image data. Next, a controller 104 causes the image data to be displayed on a display unit 102 and stores this image data in a storage unit 105 when a shutter is actuated.

Next, after the user selects an image to be printed out, a layout and number of output copies, the image data obtained by imaging is sent to a data interface (I/F) 112 of the printer 117. After this image data is subjected to image processing such as a density conversion, black generation, masking, a gamma correction and binarization by an image processing unit 115 via a controller 114, the processed data is sent to a printer engine 116, which proceeds to print out the data on printing paper.

The power supply system of this embodiment will now be described.

When the AC adapter 123 is connected to the printer 117, each device is recognized by the data interface 106 of the digital camera 109, the data interface 112 of the printer 117 and a data interface 120 of the AC adapter 123 via signal lines 110, 118, and the distribution of power (voltage and current) is decided based upon the properties of each of the devices.

More specifically, whenever the state of connection of a device changes, 5-volt current-limited power is supplied by the AC adapter 123 from a power-source controller 121 to the printer 117 via a power supplying line 119. The power that has thus been supplied to the printer 117 is then supplied from a power controller 113 of the printer 117 to the digital camera 109 via a power supplying line 111. The data interface 112 of the printer 117 uses this power to recognize each device connected to the printer 117 and acquire the properties of these devices. The power controller 113 decides the power (voltage and maximum current) to be supplied from the AC adapter 123 and controls the power-source controller 121 of the AC adapter 123 via the data interfaces 112 and 120.

Next, in accordance with the distribution of power thus decided, the power controller 113 of the printer 117 switches the operating mode of the printer 117 and, at the same time, changes over the power supplied to the digital camera 109 via the power supplying line 111. A power controller 107 in the digital camera 109 switches the operating mode of the digital camera 109 in accordance with the above-mentioned power changeover. For example, if the power supplied by the AC adapter 123 is less than the total maximum power consumption by the digital camera 109 and printer 117, then the operating mode of the printer 117 or of the digital camera 109 is switched to a mode of reduced power consumption, whereby the total power consumption is set so as to fall below the power source capacity of the AC adapter 123.

FIG. 2 illustrates the specific connection of cables according to this embodiment.

In this embodiment, two connectors, one for data transfer and one for supply of power for each device, are integrated into a single connector and the single connectors of mutually adjacent devices are connected by a single cable.

The cable is indicated at 150 in FIG. 2. As mentioned above, the cable 150 has a signal line for transferring data and a power line for supplying power. The cable 150 is equipped with plugs A and B at its ends. The cable 150 is connected to the connector on the power supply side by plug B and to the connector on the power receiving side by plug A. By thus using different connection plugs on the power supply and power receiving sides, conflict of power sources is avoided and erroneous connections-by the user can be prevented. Since there is strong demand for greater compactness in regard to the digital camera 109, usually it is preferred that the connection plug on the power receiving side be smaller than that on the power supply side.

FIG. 3 illustrates a case where the digital camera 109 and AC adapter 123 are directly connected without the intervention of the printer. Only the AC adapter 123 can be connected to the digital camera 109 in the manner illustrated merely by substituting it for the printer 117 shown in FIG. 2. In other words, the data interface 106 and power controller 107 of the digital camera 109 are connected to the data interface 120 and power-source controller 121, respectively, of the AC adapter 123 via the cable 150. In this case the digital camera 109 is recognized by the data interfaces 106, 120 when the connection to the AC adapter 123 is made, as a result of which the required power is supplied from the AC adapter 123.

FIG. 4 illustrates another example in which the digital camera 109 and AC adapter 123 are directly connected. This example is characterized by the fact that the AC adapter 123 and cable 150 are integrated in the manner illustrated. That is, the plug A is directly connected to the AC adapter 123 so the connection to the digital camera 109 is made possible without use of a separate cable. The AC adapter 123 can of course be connected to the printer 117 of FIG. 2 as well. By adopting the arrangement of FIG. 4, a cable for connecting the AC adapter 123 is made unnecessary. This makes it possible to reduce the cost of connecting the AC adapter 123.

In the system configuration of this embodiment, the AC adapter 123 can be controlled by a signal line. As a result, charging at a constant current is possible by limiting the supplied power to a current value that is needed to charge the battery of the digital camera 109, for example. At such time the power controller 107 of the digital camera 109 monitors the voltage when charging is being carried out and, when the prescribed voltage is attained, controls the power-source controller 121 of the AC adapter 123 by the data interfaces 106, 120 to effect a changeover to constant-voltage drive. This makes it possible to reduce the cost of the digital camera 109.

The AC adapter 123 of this embodiment makes it possible to connect all devices having identical interfaces. Each device connected to the AC adapter 123 switches its operating mode in dependence upon the supplied power capacity and distributes power in optimum fashion. As a result, a malfunction does not occur even if power supply capacity is inadequate. For example, if the digital camera 109 is using a liquid crystal viewfinder for the display, it is possible to reduce power consumption by turning off backlighting of the liquid crystal panel or by turning off the power source of the image sensing unit when printing is being carried out. Power can be conserved in the printer 117 as well by controlling the number of dots, etc., that are printed simultaneously. Alternatively, since power consumption peaks when an image is output in this embodiment, peak power can be reduced by performing control so as to turn off power to the digital camera 109 (or establish a power conservation mode) when an image is output.

Further, by adopting the single, common AC adapter 123 for all devices, not only is user convenience enhanced but connection cost is reduced as well.

Thus, in accordance with the embodiment as described above, two connectors, one for data transfer and one for supply of power, are combined into a single connector in a system connecting a plurality of devices so that a single, common cable may be used for connecting mutually adjacent devices together. As a result, it is easier to connect devices together and it becomes possible to reduce the space required for the connectors of the devices as well as the cost of making the connections.

Further, by equipping an external power source such as an AC adapter with the same connector, it becomes possible to control the external power source by a signal line and, at the same time, the power supply capacity of the external power source can be distributed effectively and dynamically.

By consolidating external power sources into a single power source, the number of required connectors and the number of AC outlets can be reduced and user convenience can be greatly enhanced.

By consolidating external power sources that were necessary for each of the devices into a single, common external power source, user convenience is improved and cost can be reduced.

Furthermore, by using different types of connection plugs on the power supply and power receiving sides, conflict of power sources is avoided and erroneous connections by the user can be prevented.

SECOND EMBODIMENT

A second embodiment according to the present invention will now be described.

Figure 5A:
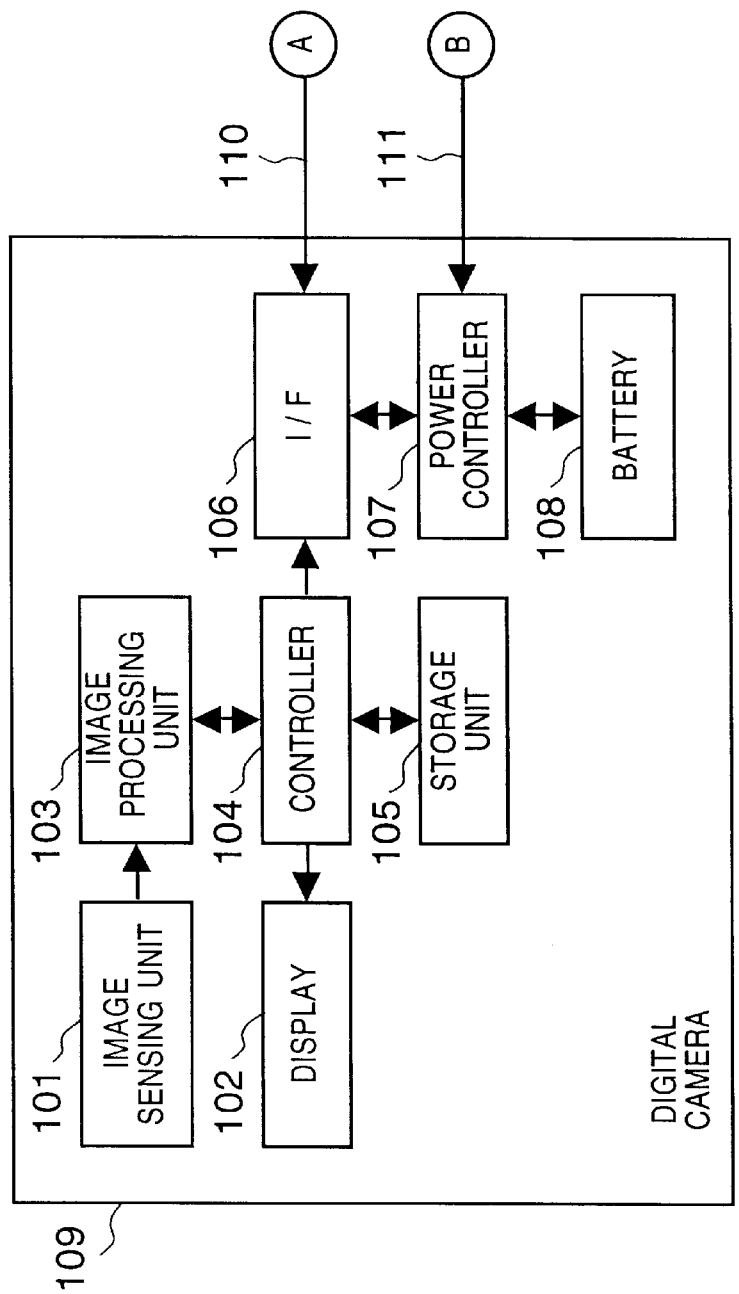
FIGS. 5A and 5B are block diagrams illustrating the configuration of an power control system in a second embodiment of the present invention.
Figure 5B:
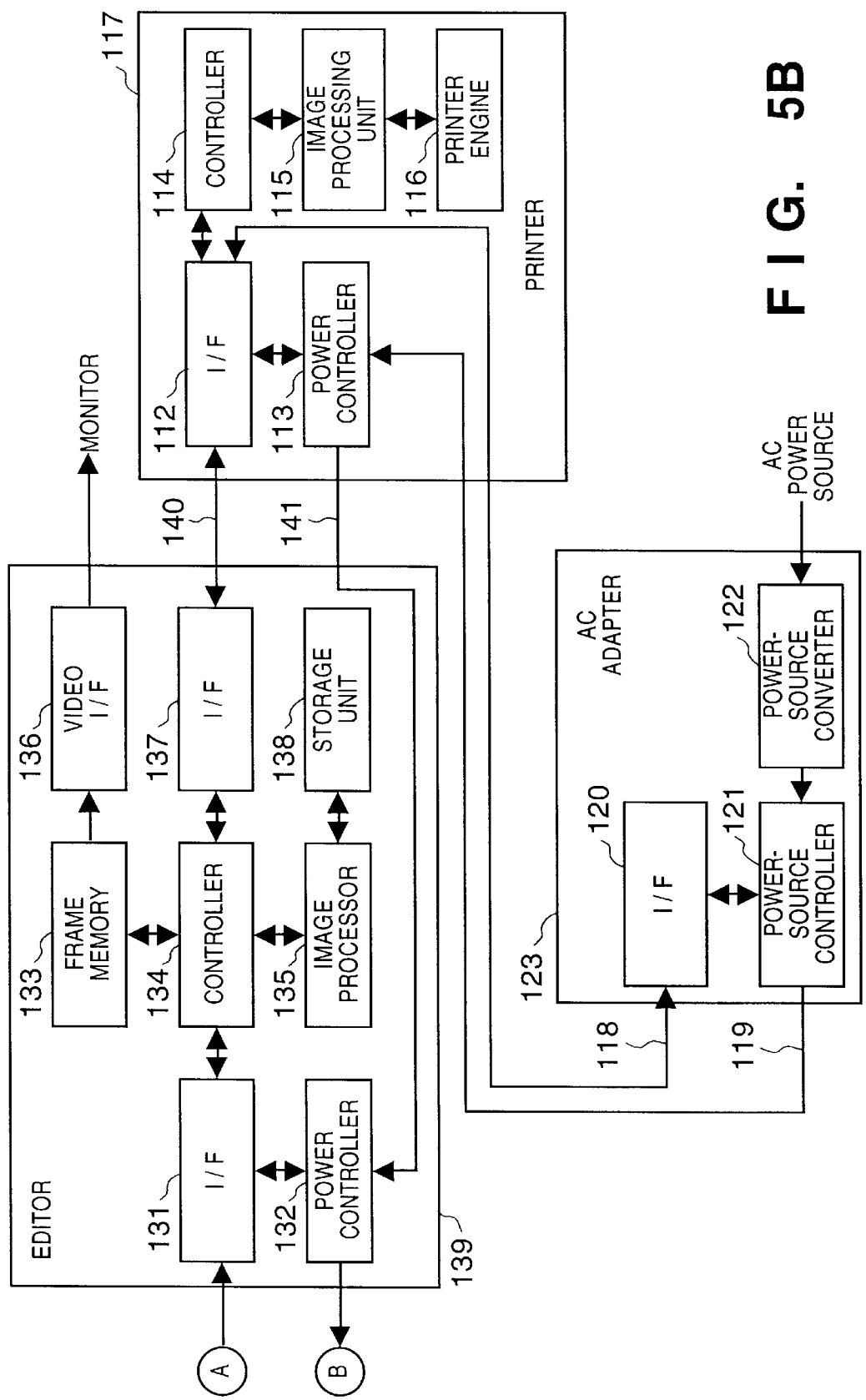

FIGS. 5A and 5B are block diagrams showing the configuration of an image processing system according to the second embodiment. This embodiment will be described in regard to an example in which an editor 139 serving as an editing device is connected to the system configuration of the first embodiment. Components identical with those of the first embodiment are designated by like reference characters and need not be described again.

The second embodiment also is such that each device has a data interface for performing a data transmission and a power controller for controlling power, and the supplied power is controlled by controlling the power controller of each device via its data interface. To simplify the description, the example illustrated is one in which the editor 139 has two data interfaces, namely 131 and 137. However, it is possible to implement these interfaces by a single data interface.

The editor 139 is for editing an image printout based upon instructions from the user. First, the user selects the paper and the output image, whereupon a controller 134 in the editor 139 causes the data interface 131 to issue a request in response to which the selected output image data is acquired from the digital camera 109 and stored in a storage unit 138. Next, a plurality of layouts (inclusive of background) are chosen based upon the sizes (numbers of pixels) of the selected images and the number of selected images, and thumbnail images, which are obtained by combining the selected images with the chosen layouts, are written to a frame memory 133, the number of thumbnail images corresponding to the number of layouts chosen. The thumbnail images are converted to video signals by a video interface 136 and the video signals are output to a monitor, not shown.

When the user selects one of the thumbnail images that have been output on the monitor, an image processing unit 135 scales the selected image in accordance with the layout, combines the image with the background and outputs the composite image to the printer 117 from the data interface 137. The printer 117 then prints out the composite image. Alternatively, when the user selects one of the thumbnail images that have been output on the monitor, the image processing unit 135 performs scaling and combining in prescribed band units in accordance with the layout, subjects the resulting image to processing such as density conversion, black generation, masking, gamma correction and binarization and outputs the processed image to the printer 117 from the data interface 137, whereupon the printer 117 prints out the image.

The power supply system of this embodiment will now be described.

When the AC adapter 123 is connected to the printer 117, each device is recognized by the data interfaces 106, 112, 120, 131, 137 of the devices and the distribution of power (voltage and current) is decided based upon the properties of each of the devices.

More specifically, whenever the state of connection of a device changes, 5-volt current-limited power is supplied by the AC adapter 12 from the power-source controller 121 to the printer 117 via the power supplying line 119, from the power controller 113 of the printer 117 to the editor 139 via a power supplying line 141, and from the power controller 132 of the editor 139 to the digital camera 109 via the power supplying line 111.

The data interface 112 of the printer 117 uses the supplied power to recognize each device and acquire the properties of these devices. The power controller 113 decides the power (voltage and maximum current) to be supplied from the AC adapter 123 and controls the power-source controller 121 of the AC adapter 123 via the data interfaces 112 and 120.

Next, in accordance with the distribution of power thus decided, the power controller 113 of the printer 117 switches the operating mode of the printer 117 and, at the same time, changes over the power supplied to the editor 139 via the power supplying line 141. In accordance with the power changeover, the power controller 132 in the editor 139 switches the operating mode of the editor 139 and simultaneously changes over the power supplied to the digital camera 109 from the power supplying line 111. The power controller 107 of the digital camera 109 switches the operating mode of the digital camera 109 in accordance with the above-mentioned power changeover.

By way of example, if the power supplied by the AC adapter 123 is less than the total maximum power consumption of the digital camera 109, editor 139 and printer 117, then the operating mode of the printer 117, the operating mode of the editor 139 or the operating mode of the digital camera 109 is switched to a mode of reduced power consumption, whereby the total power consumption is set so as to fall below the power supply capacity of the AC adapter 123. Furthermore, the above-mentioned distribution of power may be performed by the power controller 132 of the editor 139.

FIG. 6 illustrates the specific connection of cables according to the second embodiment.

In this embodiment also, two connectors, one for data transfer and one for supply of power for each device, are integrated into a single connector and the single connectors of mutually adjacent devices are connected by a single cable.

The cable is indicated at 150 in FIG. 3. As mentioned above, the cable 150 has a signal line for transferring data and a power line for supplying power. The cable 150 is equipped with the plugs A and B at its ends. The cable 150 is connected to the connector on the power supply side by plug B and to the connector on the power receiving side by plug A. By thus using different connection plugs on the power supply and power receiving sides, conflict of power sources is avoided and erroneous connections by the user can be prevented. Numeral 160 denotes a monitor for displaying an image edited by the editor 139.

Here voltage supplied to each device is successively reduced in the order of the printer 117, editor 139 and digital camera 109, e.g., 24 volts, 12 volts and 9 volts, respectively. By thus setting the input voltage to a device that is the recipient of power to be lower than the input voltage to a device that supplies power, the effects of voltage drop can be avoided.

Figure 7:
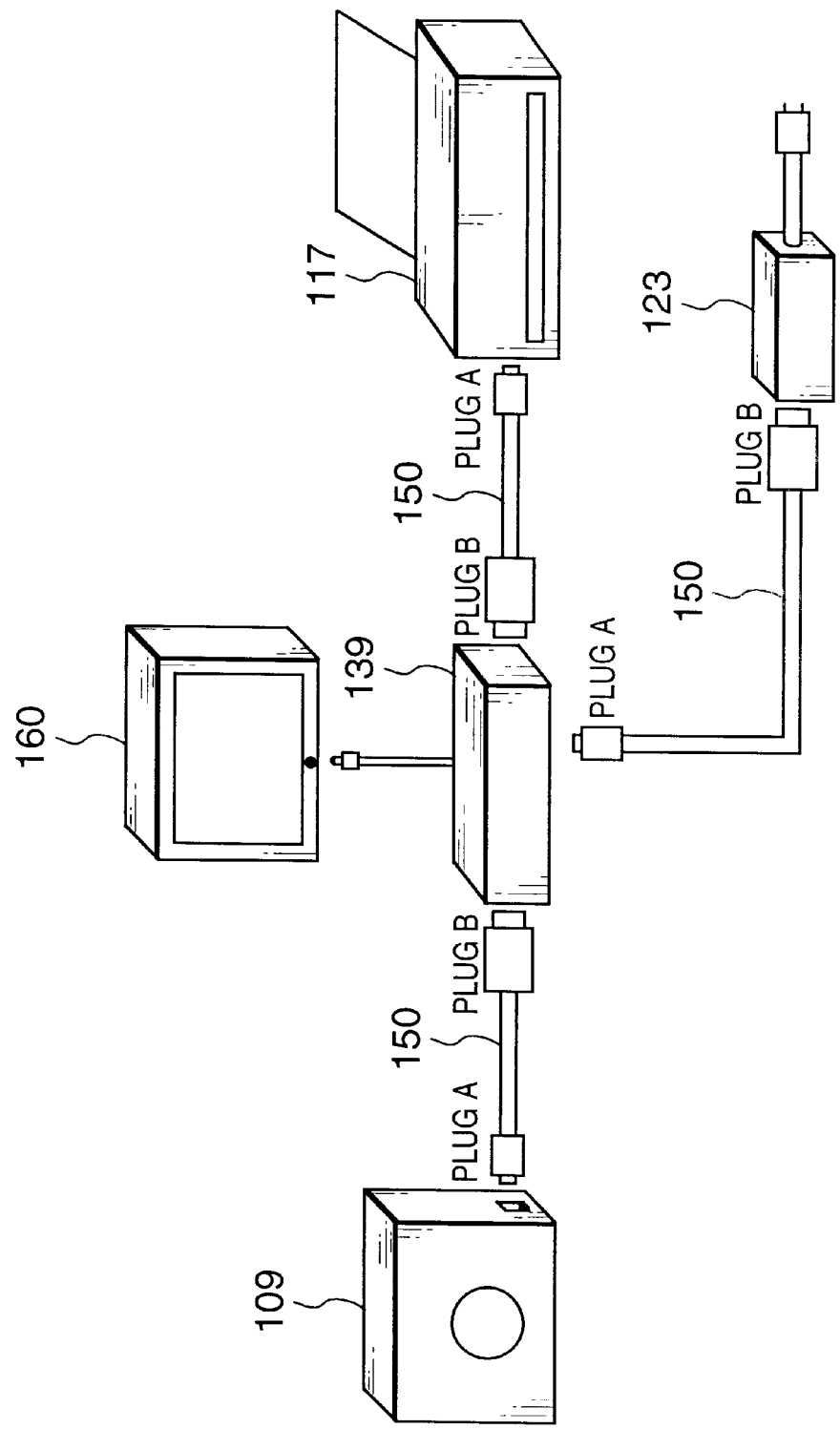
FIG. 7 is a diagram showing an example of a mode of connection between devices in the second embodiment.

FIG. 7 illustrates an example in which the AC adapter 123 is directly connected to the editor 139. In this case the digital camera 109 and printer 117 are both supplied with power from the editor 139. In this case it will suffice if the voltages supplied to the printer 117 and digital camera 109 are less than the voltage supplied to the editor 139.

Since the data interfaces 131, 137 of the editor 139 can be combined into a single interface, as mentioned earlier, the cables 150 from the digital camera 109 and printer 117 may be connected to the interface on either side.

Naturally the AC adapter 123 to which the plug A is directly connected can be connected to a device in the manner illustrated in FIG. 4 of the first embodiment.

Further, a battery may be connected instead of the AC adapter 123. Alternatively, a battery may be installed in the editor 139 or printer 117 and power may be supplied from this battery.

The second embodiment as described above provides advantages similar to these of the first embodiment.

The arrangement described in the first and second embodiments is such that the AC adapter is connected to the printer to supply the devices of the system with power. However, the present invention is not limited to this example because the AC adapter can be connected to any of the devices in the system. For example, it is possible to connect the AC adapter to the digital camera to implement the supply of power to the devices up and including to the printer.

THIRD EMBODIMENT

A third embodiment according to the present invention will now be described in detail.

In the first and second embodiments, examples in which power that has been supplied via the AC adapter is distributed appropriately to the devices connected to the system. A power control system described below in accordance with the third embodiment expands the power distribution control of the foregoing embodiments so as to provide greater versatility.

Figure 8:
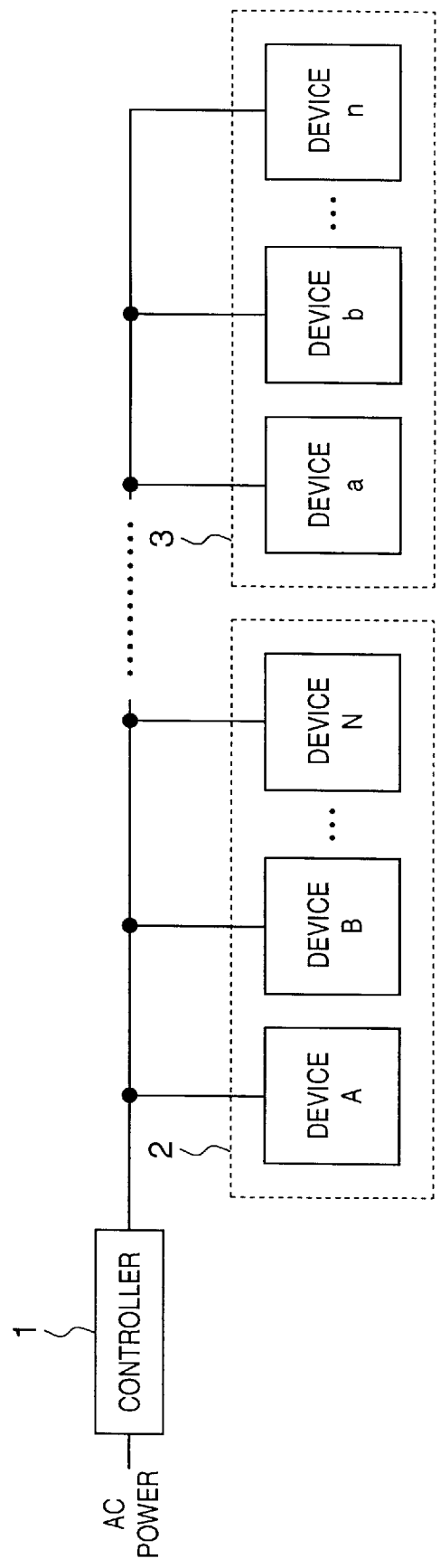
FIG. 8 is a block diagram illustrating the configuration of a power control system processing in a third embodiment of the present invention.

FIG. 8 is a block diagram showing the configuration of a power control system according to the third embodiment. This system is used as a single power channel and includes a controller 1, which also functions as an ordinary breaker, for controlling the supply of power to the system; a group 2 of devices compatible with this power control system and including devices A–N; and a group 3 of devices not compatible with this power control system and including devices a=n. These devices are all connected to the controller 1.

Figure 9:
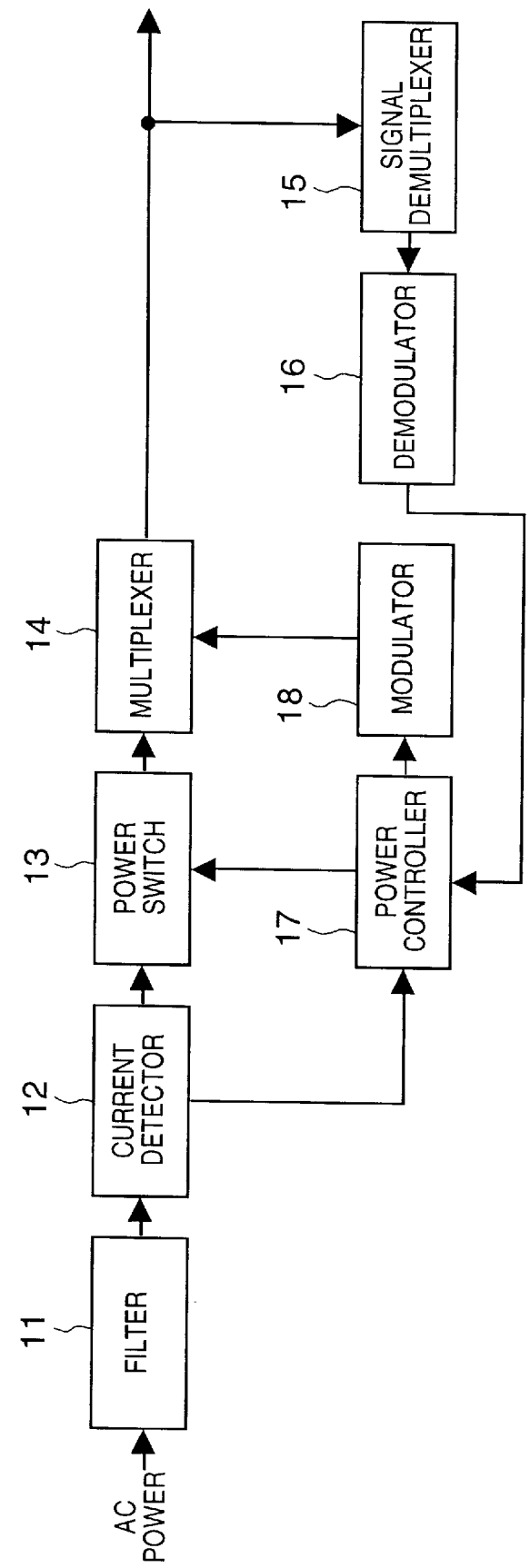
FIG. 9 is a block diagram showing the detailed construction of a controller.

FIG. 9 is a block diagram showing in detail the construction of the controller 1. The controller 1 in FIG. 9 includes a filter 11, a current detection circuit 12, a power switch (breaker) 13, a multiplexer circuit 14, a signal demultiplexer circuit 15, a demodulation circuit 16, a power controller 17 and a modulation circuit 18.

The filter 11 is provided not only to eliminate noise from the power (current) that enters from an AC power source (not-shown) but also to prevent radio interference in a power control signal, described later, and to prevent malfunction caused by the power control signal of a device connected to another power channel. The filter can be dispensed with in a case where the power control signal is capable of being identified by some other method.

AC power from which noise has been eliminated by the filter 11 is supplied to the devices A–N and a–n via the current detection circuit 12 and power-supply switch 13. The current detection circuit 12 detects the sum total of currents (referred to as "supplied current" below) supplied to each of the devices connected downstream(A–N, a–n) and outputs the result to the power controller 17.

The each device connected downstream(A–N, a–n) multiplexes the presently prevailing conditions of power use onto the AC power source line as power information. This multiplexed power information is separated from the AC power source line by the signal demultiplexer circuit 15, demodulated by the demodulation circuit 16 and then input to the power controller 17.

On the basis of the supplied current and the power information relating to each device, the power controller 17 detects any abnormality such as a short-circuit failure in each device and, if any abnormality occurs, interrupts the AC power by means of the power switch 13. By way of example, when the difference between the value of supplied current and the sum total of the current values (which sum total is referred to as "current drain" below) of the each of the devices exceeds the limit value of the power supply line in this system (i.e., when a failure occurs), then a decision is rendered to the effect that a short-circuit failure has occurred in a device and the AC power is interrupted.

When the difference between the supplied current and the current drain is less than the limit value of the power supply line and, moreover, the supplied current is greater than the limit value of the power supply line (i.e., when too much power is supplied), the power consumption mode of each device is decided in such a manner that the supplied current will fall below the limit value, and a power control signal indicating this power consumption mode is transmitted to each device via the modulation circuit 18 and multiplexer circuit 14. As a result, the power consumption mode of each device can be changed. It should be noted that a change in power consumption mode is decided based upon a priority set beforehand for each device or based upon a priority set beforehand for each device and, furthermore, for every mode of each device.

When too much power has been supplied, the power controller 17 controls each device by transmitting a power control signal.from a device consuming too much power so as to turn off the power source in a case where a change in the power consumption mode is not possible or in a case where the supplied current will not fall below the limit value of the power supply line even if the power consumption mode is changed.

It should be noted that since the above-mentioned difference between supplied current and the current drain corresponds to the sum total of the currents in the device group 3 not compatible with this power control system, control by the power controller 17 is not possible.

Figure 10:
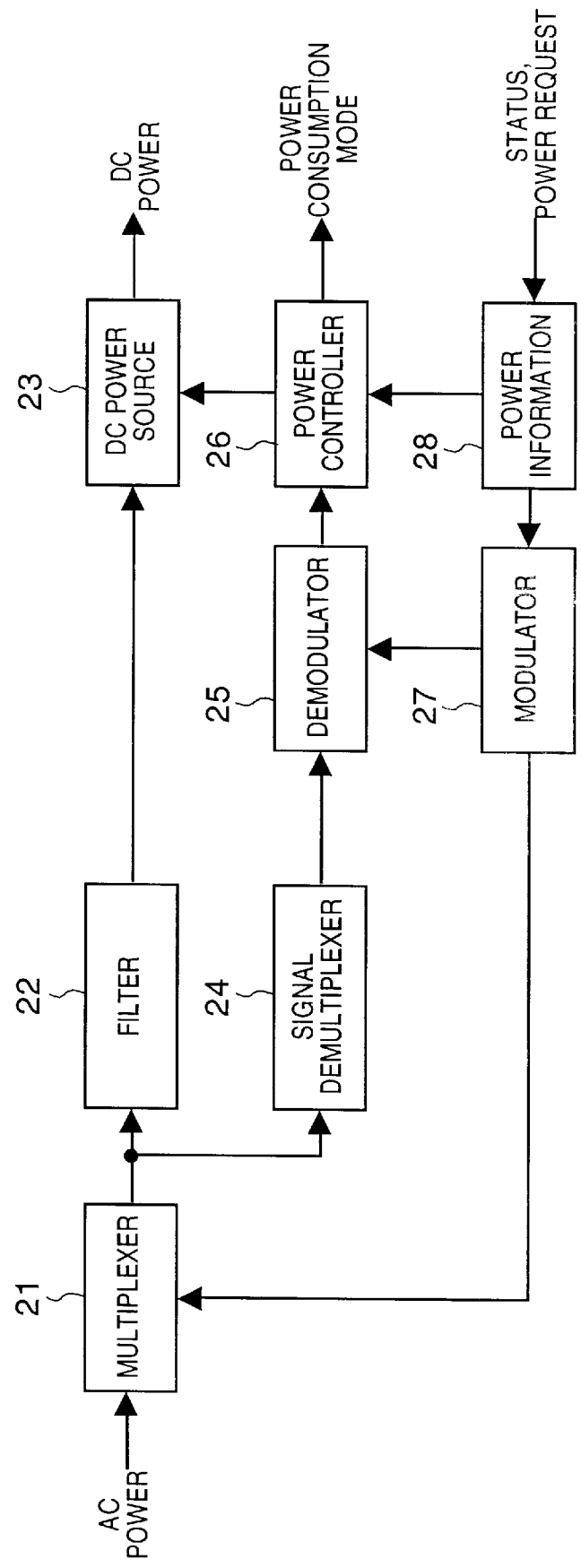
FIG. 10 is a block diagram showing the construction of a power controller in a device that is compatible with the power control system.

FIG. 10 is a block diagram showing an arrangement in which control of power is carried out in one device of the device group 2 compatible with the system.

This device includes a multiplexer circuit 21, a filter 22, a DC power supply circuit 23, a signal demultiplexer circuit 24, a demodulation circuit 25, a power controller 26, a modulation circuit 27 and a power information generating circuit 28.

AC power supplied to the device is directed through the multiplexer circuit 21 and has noise and multiplexed signals eliminated by the filter 22. The filtered signal is then applied to the DC power supply circuit 23. In the manner described above, the power control signal than has been multiplexed onto the AC power source line by the controller 1 is separated from the AC power supply line by the signal demultiplexer circuit 24, demodulated by the demodulation circuit 25 and input to the power controller 26.

The power controller 26 sets the power consumption mode of this device based upon the entered power control signal. The DC power supply circuit 23 controls the supply of power to this device in accordance with the setting made by the power controller 26. Furthermore, the power consumption mode that has been set is transmitted also to an application control unit(not shown) of the device, and control is performed so as to operate the device in this power consumption mode in the application control unit as well.

The power information generating circuit 28 generates power information necessary to control power in this system. The power information includes the types of power consumption modes capable of being set in the device, the current values of these modes and their priorities, and the power consumption mode currently set. This power information is transmitted to the controller 1 via the modulation circuit 27 and multiplexer circuit 21.

Figure 11:
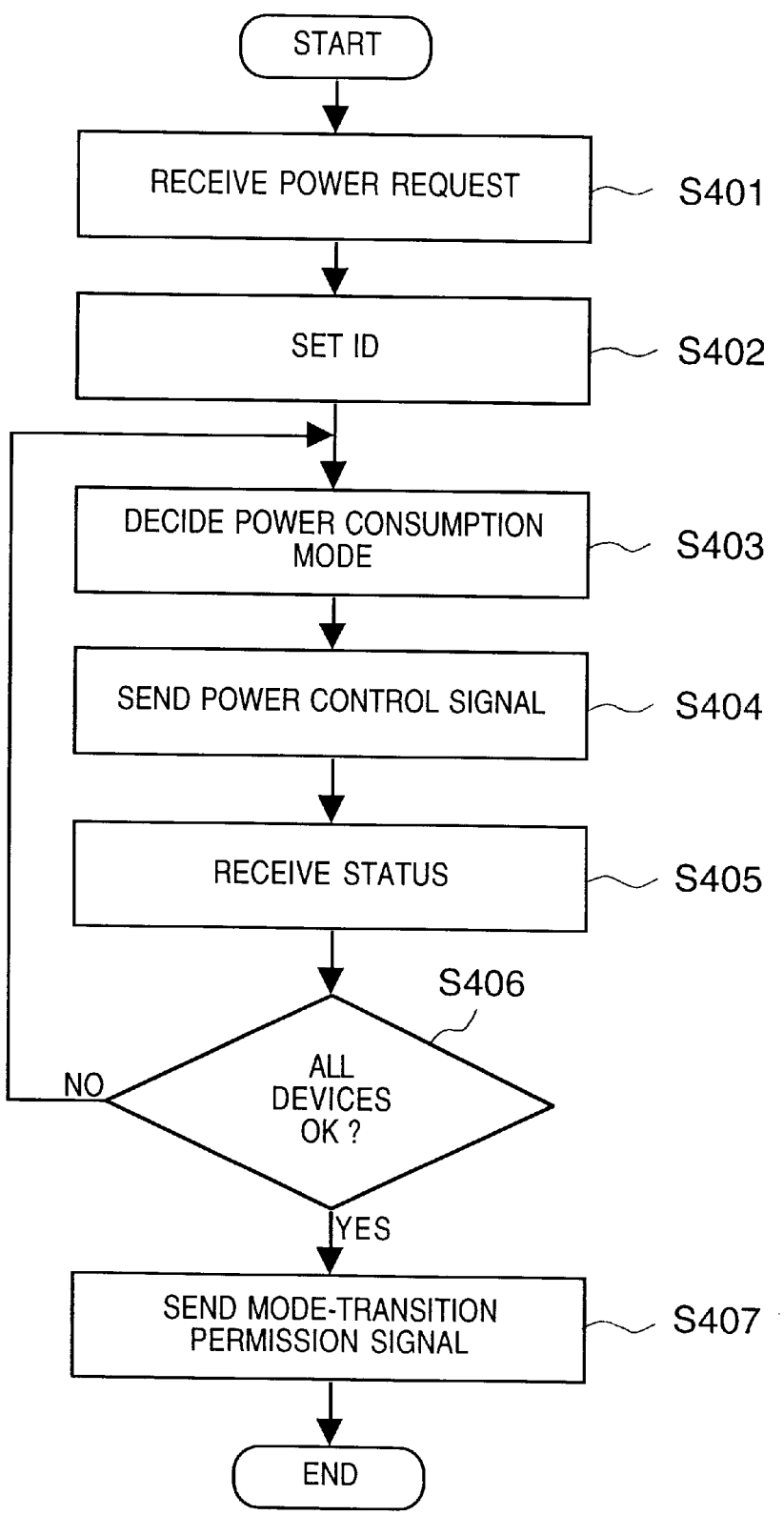
FIG. 11 is a flowchart showing power control when a device has been connected.

The operation of this power control system will now be described in detail with reference to FIG. 11, which is a flowchart illustrating power control in the controller 1.

If a new device is connected into the device group 2 on the AC line to be controlled by the controller 1, the new device first is set to a mode (referred to as the "sleep mode" below) in which only its power controller operates, and the device sends a power request signal to the controller 1. It goes without saying that the power request signal is sent when power is introduced to the connected device.

Upon receiving the power request signal (S401), the controller 1 sets an ID number specific to this device (S402) and then decides the power consumption modes for all of the devices in the device group 2, which includes this device, based upon the requested current value and the value of the alternating current presently being supplied (step S403). The controller 1 sets the power consumption modes set by sending a power control signal to each device (S404).

Upon receiving the power control signal from the controller 1, each device in device group 2 makes preparations so that it can make the transition to the power consumption mode specified by the power control signal. Each device sends back to the controller 1 a status signal indicating that the preparations have been completed and that the mode transition is possible.

Upon accepting the status signal from each device (S405) and confirming completion of the preparations for the mode transition in all of the devices (S406), the controller 1 sends a mode-transition permission signal to each device and changes the power consumption modes of all of the devices at one time (S407).

If any device in the device group 2 cannot make the transition to the power consumption mode set by the controller 1, the device sends back a status signal indicating that the transition is not possible. If the controller 1 receives such a status signal at step S405 indicating that the transition cannot be made, the controller returns processing from step S406 to step S403, decides the power distribution again and then repeats the above-described procedure.

In accordance with the third embodiment, the example described is one in which the mode transition timings of the devices are made to coincide by instructing the transitions to the power consumption modes in unison in order to prevent the allowance of the AC power supply line from being exceeded owing to a difference in power consumption mode transition timings between devices. However, since it is unnecessary to avoid a drop in current drain, a transition to a power consumption mode of a kind in which current drain declines may be performed without waiting for issuance of the mode-transition permission signal by the controller 1. It would suffice to report completion of mode changeover to the controller 1 by a status signal.

In a case where the current drain of a certain device increases owing to performing own application, the device sends a power request signal to the controller 1. The controller 1 receives this signal and again sets the power consumption mode of each device in the device group 2 through a procedure similar to that shown in FIG. 11. It should be noted that if the sum of the presently prevailing current drain and the current increased by a new request falls within the allowable range of the power source line at this time, the controller 1 may immediately issue the mode-transition permission signal only to the device in the device group 2 that generated the new request without changing the power consumption mode of devices other than the device that generated the new request.

Another conceivable case is one in which the current drained by a certain device is reduced by performing own application, as by effecting a shift to the sleep mode by means of a timer or the like. In this case it would suffice for the device to make the mode change without waiting for issuance of the mode-transition permission signal by the controller 1. Here the device would report completion of mode changeover to the controller 1 by a status signal.

In a case where a future change in current drain based upon the application can be predicted in a given device, the device sends the controller 1 a power prediction signal such as the time of the change or the current after the change. On the basis of this prediction information, the controller 1 schedules the power consumption modes of all of the devices in device group 2 and controls the power consumption mode of each device.

In the example described in the third embodiment, power information is multiplexed onto the AC power supply line to control the power supplied to the connected devices. However, it is also possible by way of example to adopt an arrangement in which power control is realized by providing a separate communication line for the purpose of communicating data between the controller 1 and each device. In such case circuitry for multiplexing and demultiplexing the power information would be unnecessary.

Thus, in accordance with the third embodiment as described above, the amount of current on a power supply line can be held below a prescribed value by controlling the power consumption mode of each device connected to an AC power supply based upon the power information relating to each device. Accordingly, it is possible to prevent an inadvertent interruption in supply of power caused by a breaker and to reduce peak current (i.e., to flatten current peaks).

FOURTH EMBODIMENT

A fourth embodiment according to the present invention will now be described.

Figure 12:
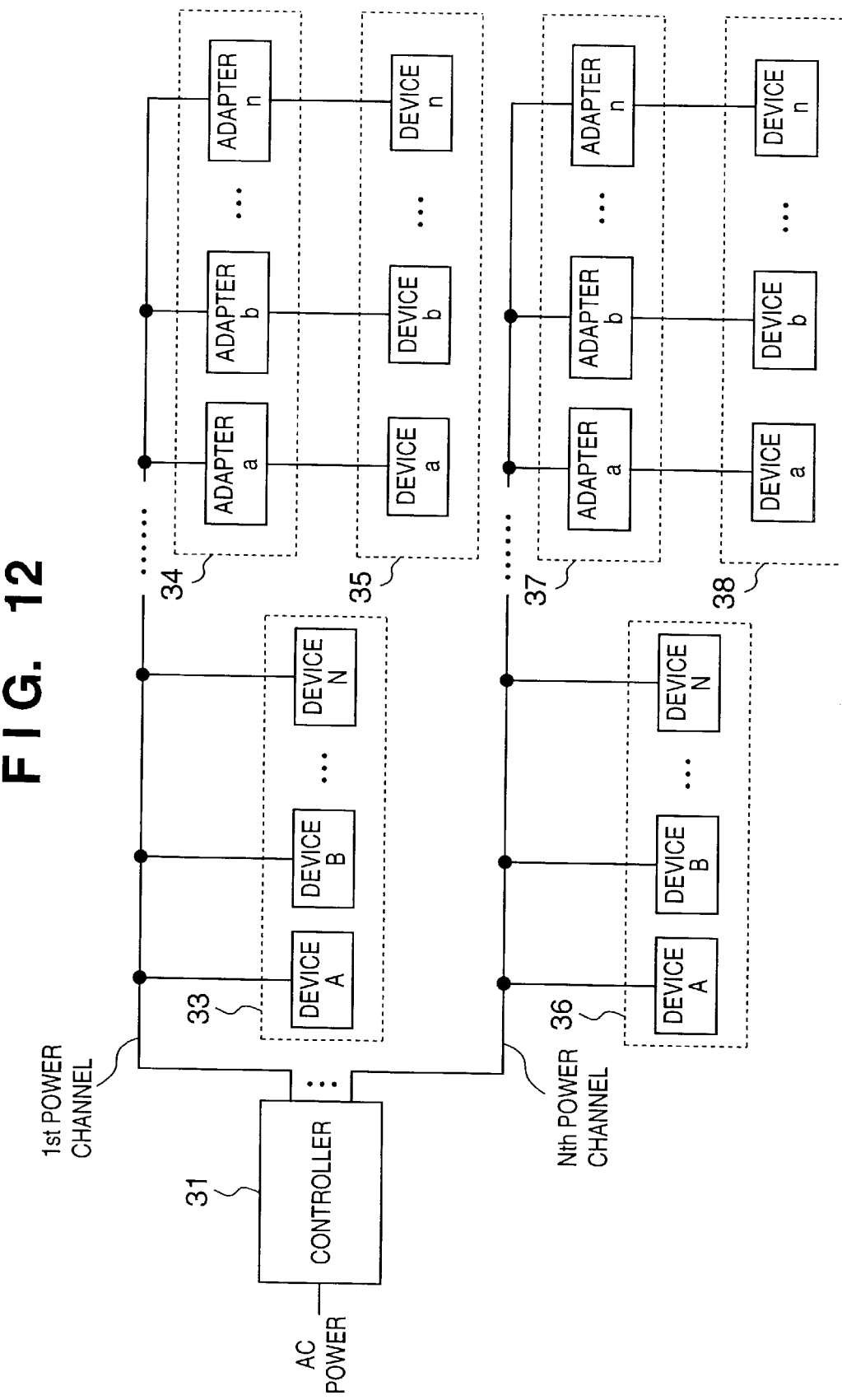
FIG. 12 is a block diagram illustrating the configuration of a power control system processing in a fourth embodiment of the present invention.

FIG. 12 is a block diagram showing the configuration of a power control system according to the fourth embodiment. Here the system has a plurality of power channels (first through Nth power channels). A controller 31 controls the supply of power and also functions as an ordinary breaker. Connected to the first power channel that is connected to the controller 31 are a device group 33 compatible with the power control system of the fourth embodiment and including devices A–N. A device group 35 is incompatible with the power control system of the fourth embodiment and includes devices a–n. In order to make the incompatible device group 35 controllable by this system, an adapter group 34 is provided and has adapters a–n corresponding to respective ones of the devices a–n in the device group 35. In the fourth embodiment, the system-compatible device group 33 and the adapter group 34 are directly connected to the controller 31.

Further, in a manner similar to that of the first power channel, a system-compatible device group 36 and a system-incompatible device group 38 are connected to the Nth power channel connected to the controller 31, the device group 38 being connected via an adapter group 37.

Figure 13:
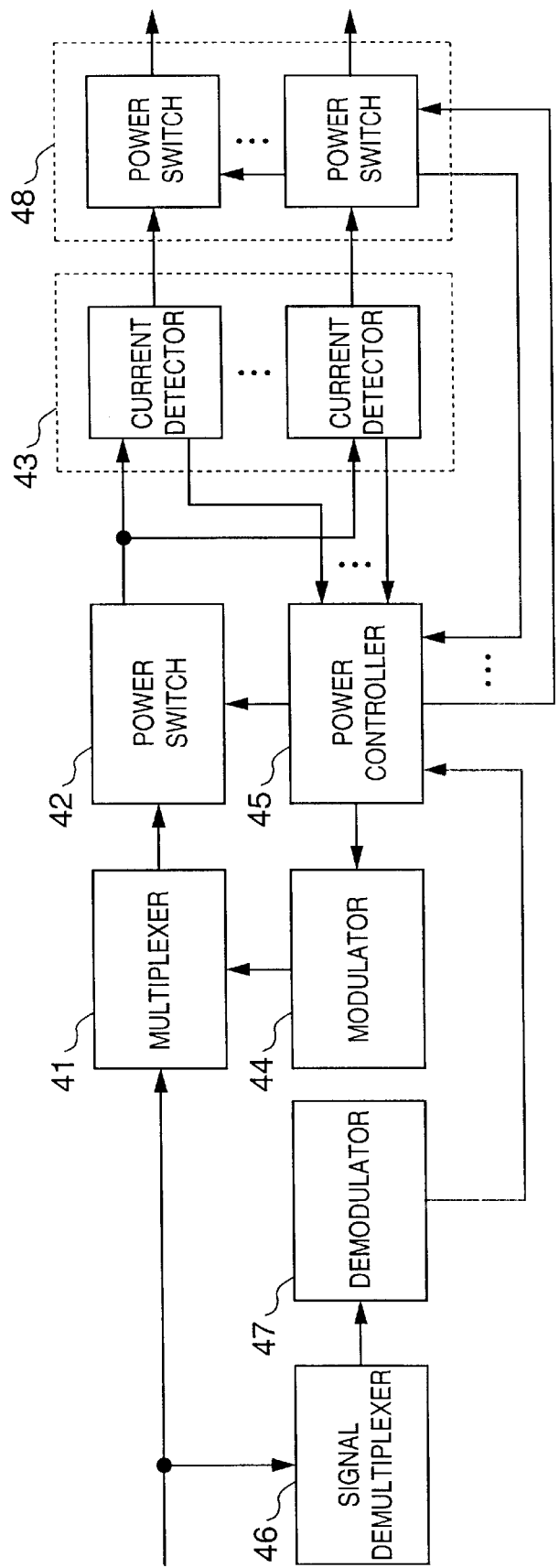
FIG. 13 is a block diagram showing the detailed construction of a controller in the fourth embodiment.

FIG. 13 is a block diagram showing in detail the construction of the controller 31. The controller 31 in FIG. 13 includes a multiplexer circuit 41, a first power switch (breaker) 42, a group 43 of current detection circuits, a modulation circuit 44, a power controller 45, a signal demultiplexer circuit 46, a demodulation circuit 47 and a group 48 of second power switches (breakers).

AC power is supplied from the first power switch 42 to each of the devices via the current detection circuits 43 and second power switches 48 by the separate power channels. The current detection circuits 43 detect, on the separate power channels, the sum totals of the currents supplied to the respective devices connected thereto and output the results to the power controller 45.

The each device connected downstream multiplexes the presently prevailing conditions of power use onto the AC power source line as power information. This multiplexed power information is separated from the AC power source line by the signal demultiplexer circuit 46, demodulated by the demodulation circuit 47 and then input to the power controller 45.

In a case where the supplied current that has entered exceeds the prescribed contracted current value for longer than a predetermined period of time, the power controller 45 interrupts the AC power by the first power switch 42. If a short circuit or other failure occurs in any device, the power controller 45 interrupts the AC power by means of the power switch 48 in the separate power channel.

If the supplied current exceeds the contracted current value, the power controller 45 decides the power consumption mode of each device in such a manner that the supplied current will be less than the contracted current and the power switch 48 will not operate (i.e., in such a manner that the current drain in each power channel will fall below the limit value), and sends a power control signal to each device via the modulation circuit 44 and multiplexer circuit 41 to thereby change the power consumption mode of each device. It should be noted that a change in power consumption mode is decided based upon a priority set beforehand for each device.

If the current drain cannot be made less than the limit value, the power controller 45 performs control so as to turn off the power source of the device whose current drain is greater than excess current that exceeded the limit value.

If a device for which power source cannot be controlled has been connected to the system, the power controller 45 uses the power switch 48 to break the power channel (e.g., the Nth power channel) to which this device is connected, thereby controlling the power of the overall system.

Figure 14:
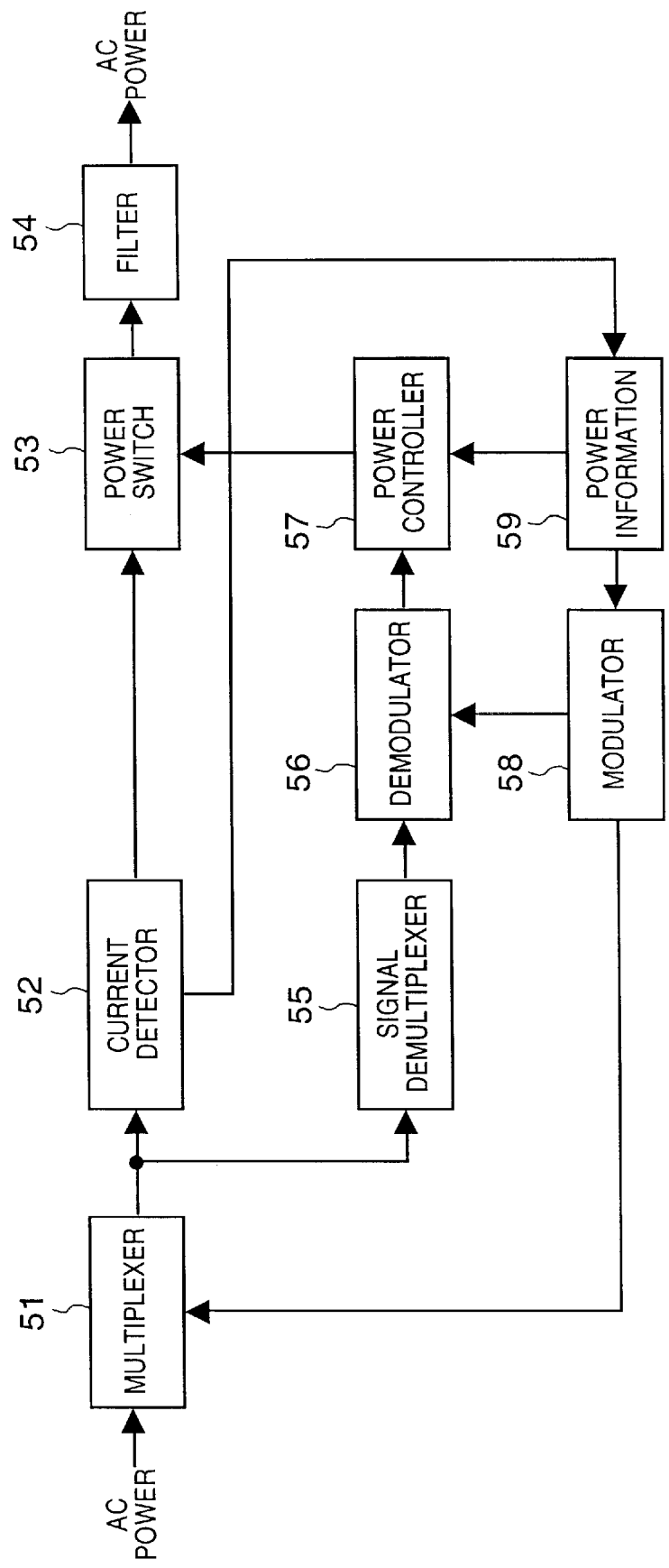
FIG. 14 is a block diagram showing the detailed construction of an adapter in the fourth embodiment.

FIG. 14 is a block diagram showing the detailed construction of one of the adapters 34, 37 that are for connecting the system-incompatible device groups 35, 38 to this power control system according to the fourth embodiment. The device includes a multiplexer circuit 51, a current detection circuit 52, a power switch (breaker) 53, a filter 54, a signal demultiplexer circuit 55, a demodulation circuit 56, a power controller 57, a modulation circuit 58 and a unit 59 for setting power control information.

AC power input to this adapter is directed through the multiplexer circuit 51, current detection circuit 52 and power switch 53 and has noise and multiplexed signals eliminated by the filter 54. The filtered signal is then applied to the next device downstream. The power control signal that has been multiplexed by the controller 31 is separated from the AC power source line by the signal demultiplexer circuit 55, demodulated by the demodulation circuit 56 and input to the power controller 57. The power controller 57 performs control to turn the power switch 53 on and off in accordance with this power control signal.

In order for power to be controlled, the current value detected by the current detection circuit 52 and the priority setting and power consumption setting decided in this adapter are sent from the power control information setting unit 59 to the controller 31 via the modulation circuit 58 and multiplexer circuit 51.

The operation of the power control system according to the fourth embodiment will now be described. In the fourth embodiment, a device compatible with this system or an adapter is connected to the AC power source line. The method of controlling power in the case where a device is newly connected in accordance with the fourth embodiment is similar to that set forth in the flowchart of FIG. 11 illustrated in the first embodiment and need not be described again.

Figure 15:
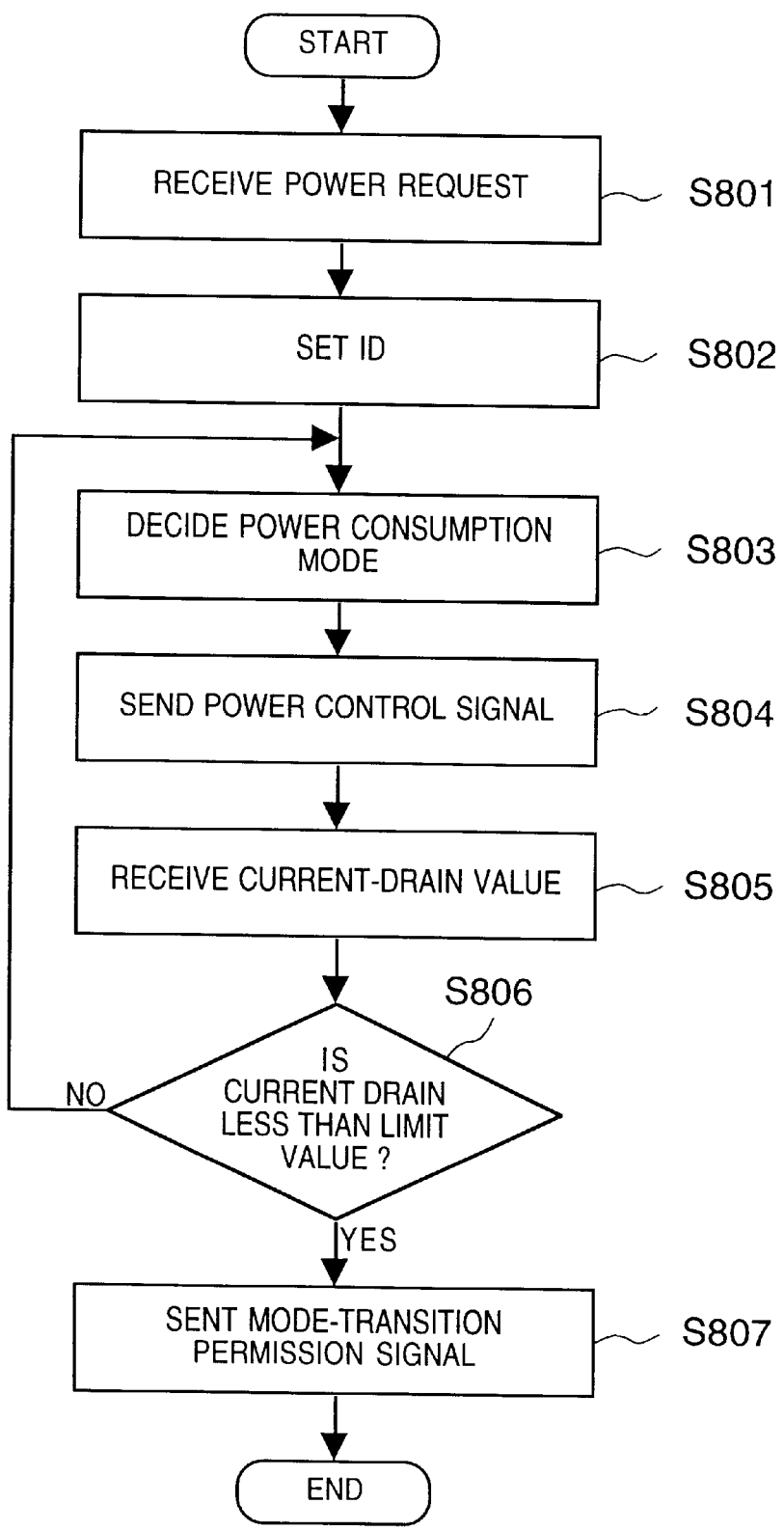
FIG. 15 is a flowchart showing power control when the adapter is connected.

The power control method in a case where an adapter is newly connected to the system will now be described with reference to the flowchart of FIG. 15.

If an adapter is newly connected on an AC power source line (one of the first through Nth channels) to be controlled by the controller 31, this adapter sends a power request signal (priority setting, power consumption setting, etc.) to the controller 31 in a state in which the power switch 53 within the adapter is open.

Upon receiving the power request signal (S801), the controller 31 sets an ID number specific to this adapter (S802) and then decides the power consumption modes for all of the devices and adapters in this system, which includes this adapter, based upon the requested current value and the value of the alternating current presently being supplied (step S803). The controller 31 sets the power consumption modes set by sending a power control signal to each device and adapter (S804).

Upon receiving the power control signal from the controller 31 indicating permission to use power, the newly connected adapter closes its internal power switch 53 to supply power to the device downstream. The adapter then sends the current value, which has been detected by the current detection circuit 52, back to the controller 31 (S805).

On the basis of the current value from the adapter and the current values of each of the power channels, the controller 31 evaluates the power channel to which the adapter is connected and, at the same time, determines whether the current drain in each power channel exceeds the limit value (S806). If current drain exceeds a prescribed limit value, then control returns to step S803 and the controller 31 sets the power consumption mode of each device again.

If it is found at step S806 that current drain is less than the limit value, the controller 31 sends a mode-transition permission signal to each device and each adapter and changes the power consumption modes at one time (S807).

It should be noted that the controller 31 evaluates the power channel to which a device or adapter has been newly connected on the basis of the current value of each power channel and stores this information in a register (not shown) within its power controller 45. As a result, it is possible in the fourth embodiment to control power in each power channel. More specifically, the controller 31 checks the current value in each power channel as well as the status (current drain, etc.) of each device and adapter at prescribed time intervals and controls the current drain of each device and adapter in the system in such a manner that the supplied current will always be less than the limit value.

In a case where the current drain of a certain device (adapter) increases owing to performing own application, the device (adapter) sends a power request signal to the controller 31. The controller 31 receives this signal and again sets the power consumption mode of each device and adapter through a procedure similar to that shown in FIG. 11. It should be noted that if the sum of the presently prevailing current drain and the current increased by a new request falls within the allowable range of the power source line at this time, the controller 31 may immediately issue the mode-transition permission signal only to the device (adapter) that generated the new request without changing the power consumption mode of devices and adapters other than the device (adapter) that generated the new request.

Consider a case where the current drained by a certain device (adapter) is reduced by performing own application, as by effecting a shift to the sleep mode by means of a timer or the like. In this case it would suffice for the device (adapter) to make the mode change without waiting for issuance of the mode-transition permission signal by the controller 31. Here the device (adapter) would report completion of mode changeover to the controller 31 by a status signal.

Though the adapters in the fourth embodiment may be connected to an AC power source line as discrete devices, it is also permissible to internally incorporate the adapters in a tabletop or the like for connecting the device groups 35, 38.

Further, an adapter can be provided with LEDs of a plurality of colors and, say, a green LED can be lit during supply of power and a red LED when supply of power is interrupted, thereby making it easy to check the operation of the adapter. This makes it easy to discover the occurrence of any abnormalities. Further, before the supply of power is interrupted by the controller 31, it is effective to issue a warning as by an audible tone or the like.

Thus, in accordance with the fourth embodiment as described above, a device that is not compatible with the system is connected to an AC power source line via an adapter. As a result, the current drained in the device can be detected by the adapter and the supply of power to the device can be controlled via the adapter. This supplements the advantages obtained by the third embodiment with the ability to control a device that is incompatible with the power control system.

In the fourth embodiment, the multiplexer circuit 41 and signal demultiplexer circuit 46 are placed in front of the power switch (breaker) 42 within the controller 31 and the operation of the power switch 42 is controlled by software. By assigning an ID specific to the controller 31 beforehand, therefore, it is possible to change the contracted current, through use of a power transmission line, on the side of the manager (the power company or the like) managing the limit value of the supplied current as a contracted current. This makes remote control of the system possible. In this case it would be possible for the status signals indicating such items as the current value of the system to be received on the management side.

The third and fourth embodiments relate to examples in which the controller checks the current drain of each device at prescribed times. However, in a case where a change greater than that prescribed has occurred in current drain on the device side, such information can be reported to the controller side to make possible the re-distribution of supplied current. In such case communication would take place only if a change in current occurs, thus making it possible to reduce traffic. Furthermore, a threshold value for when a change in current drain detected on the device side is reported to the controller may be set in accordance with any current leeway (the difference between current drain and limit value) in an AC power source line. This makes it possible to control how frequently re-distribution of supplied current is performed. For example, if there is a large current leeway in an AC power source line, setting the threshold value large reduces the number of times a communication is made from the device side to the controller side. This makes it possible to reduce the number of times current is re-distributed.

Thus, in accordance with the present invention as described above, the signal-line connector of each of a plurality of devices connected into a system can be integrated with the power-supply connector of the device to make possible the use of-a single, common cable. As a result, it is easier to connect devices together and it becomes possible to reduce the space required for the connectors of the devices as well as the cost of making the connections.

Further, effective distribution of power can be performed among a plurality of devices by dynamically controlling the supply of power on a line.

FIFTH EMBODIMENT

A fifth embodiment according to the present invention will now be described.

In the fifth embodiment, the digital interface defined as IEEE 1394-1995 (to be referred to as a "1394 serial bus" hereinafter) is applied to the digital interface which connects plural devices described in the first and second embodiments.

The outline of the 1394 serial bus will be described below.

Outline of 1394 Serial Bus

With the appearance of general digital video cam recorder (VCR) and digital video disk (DVD) player, there is a need for transferring realtime and large amount data such as video data and audio data (hereinafter referred to as "AV data"). To transfer AV data in realtime to a personal computer (PC) or other digital devices, an interface capable of high-speed data transfer is required. The 1934 serial bus has been developed from the above purpose.

Figure 16:
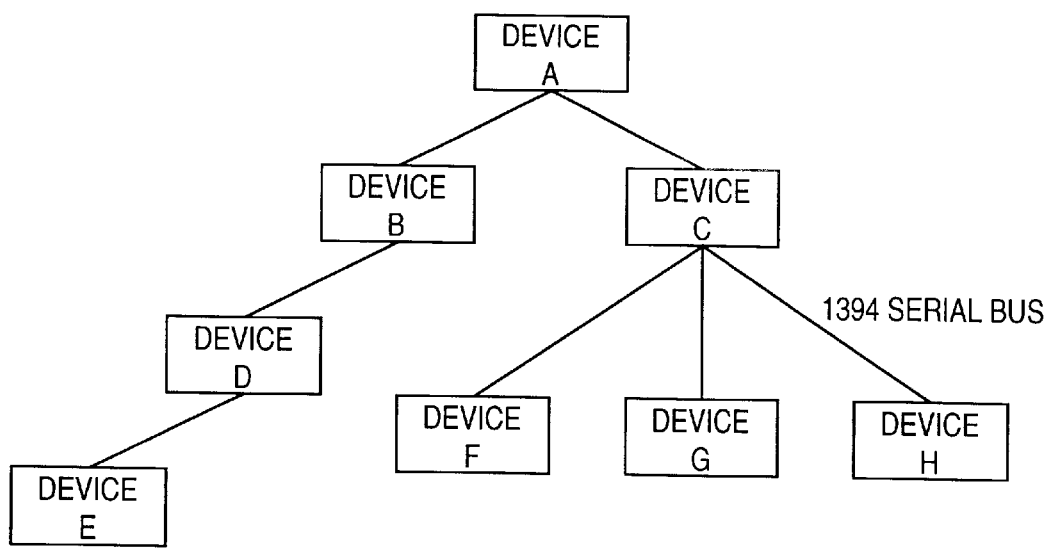
FIG. 16 is a block diagram showing an example of a network system constructed with an IEEE 1394 serial interface in a fifth embodiment of the present invention.

FIG. 16 shows an example of a network system constructed with a 1394 serial bus. This system comprises devices A to H, and the devices A and B, the devices A and C, the devices B and D, the devices D and E, the devices C and F, the devices C and G, and the device C and H are respectively connected by a twisted pair cable for the 1394 serial bus. These devices A to H may be computers such as a personal computer, or most computer-peripheral devices such as a digital VCR, a DVD player, a digital still camera, a storage device using a storage medium such as a hard disk or an optical disk, a monitor such as a CRT or an LCD, a tuner, an image scanner, a film scanner, a printer, a MODEM, and a terminal adapter (TA), a Set-Top-Box, a digital television, a conference camera, a digital video system and a complex machine of them.

Note that the printing method of the printer may be any method, e.g., a laser-beam printing, an electrophotographic method using an LED, an ink-jet method, a thermal-transfer method of ink melting or ink sublimation type and a thermo-sensitive printing method.

The connection between the devices may be made by intermixing a daisy chain method and a node branching method, thus realizing high-freedom of connecting.

The respective devices have an ID, and they construct a network by identifying each ID within a range connected by the 1394 serial bus. For example, the devices, respectively, take a relaying role when connected in a daisy-chain with cables for the 1394 serial bus, thus constructing a network.

As the 1394 serial bus corresponds to Plug and Play function, it automatically recognizes a device connected to the cable, thus recognizes connection status. In the system as shown in FIG. 16, when a device is removed from the network, or a new device is added to the network, the bus is automatically reset (i.e., the current network constructing information is reset), and a new network is constructed. This function enables realtime setting and recognition of network construction.

The 1394 serial bus has a data transfer speed defined as 100/200/400 Mbps. A device having a high transfer speed supports a lower transfer speed, thus maintaining compatibility. As data transfer modes, an asynchronous transfer mode (ATM) for transferring asynchronous data such as control signals, an isochronous transfer mode for transferring isochronous data such as realtime AV data are available. In data transfer, within each cycle (generally 125 ms/cycle), a cycle start packet (CSP) indicating the start of cycle is transferred, and then asynchronous and isochronous data are mixedly transferred such that the isochronous data transfer is transferred prior to the asynchronous data.

Figure 17:
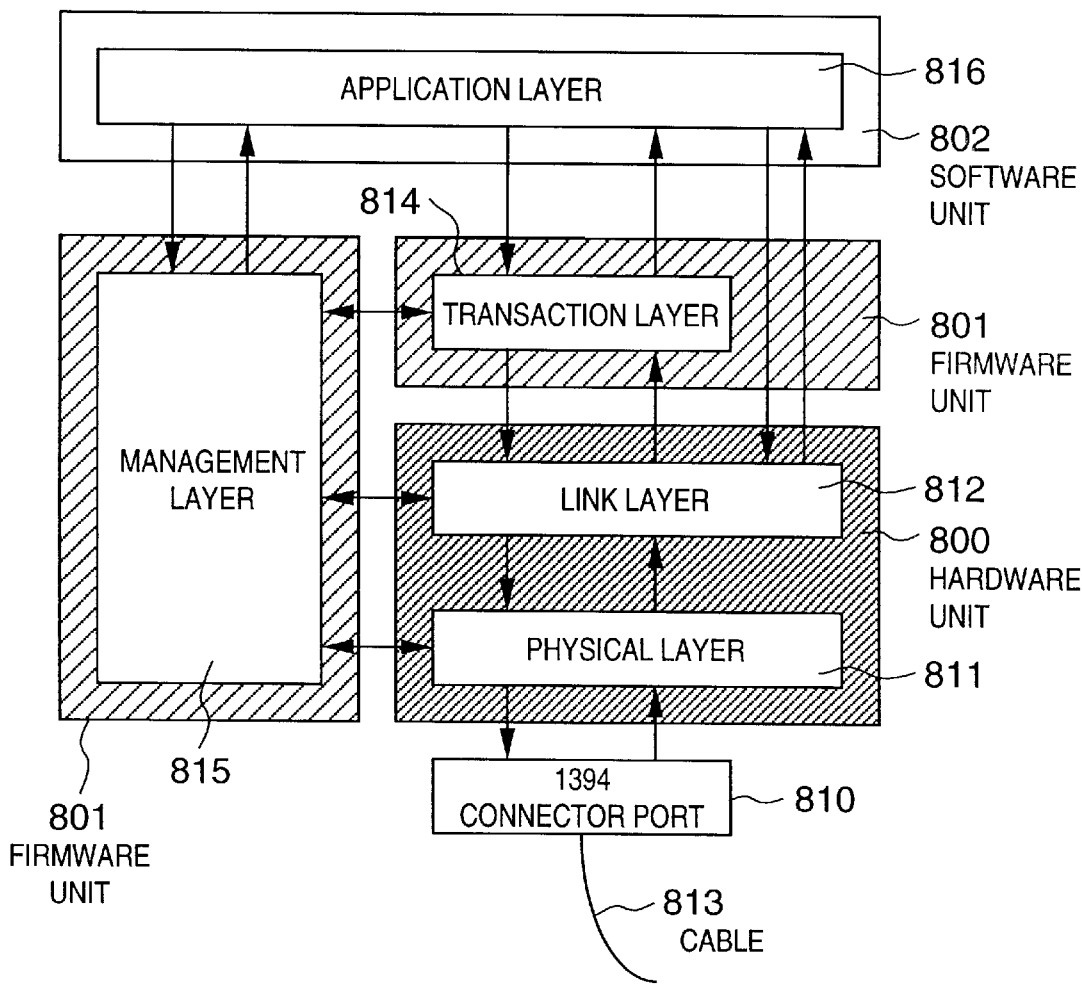
FIG. 17 is a block diagram showing the construction of the IEEE 1394 serial interface.

FIG. 17 shows the construction of the 1394 serial bus, as a layer structure. As shown in FIG. 17, a connector port 810 is connected to a connector at the end of a cable 813 for the 1394 serial bus. A physical layer 811 and a link layer 812 in a hardware unit 800 are positioned as upper layers with respect to the connector port 810. The hardware unit 800 comprises interface chips. The physical layer 811 performs coding, connection-related control and the like, and the link layer 812, packet transfer, cycle-time control and the like.

In a firmware unit 801, a transaction layer 814 manages data to be transferred (transaction data), and outputs commands Read, Write and Lock. A management layer 815 in the firmware unit 801 manages connection statuses and ID's of the respective devices connected to the 1394 serial bus, thus manages the network construction. The above hardware and firmware units substantially construct the 1394 serial bus.

In a software unit 802, an application layer 816, differs in software used by the system, and the data transfer protocol indicating how to transfer data on the interface is defined by a protocol such as a printer protocol or an AV/C protocol.

Figure 18:
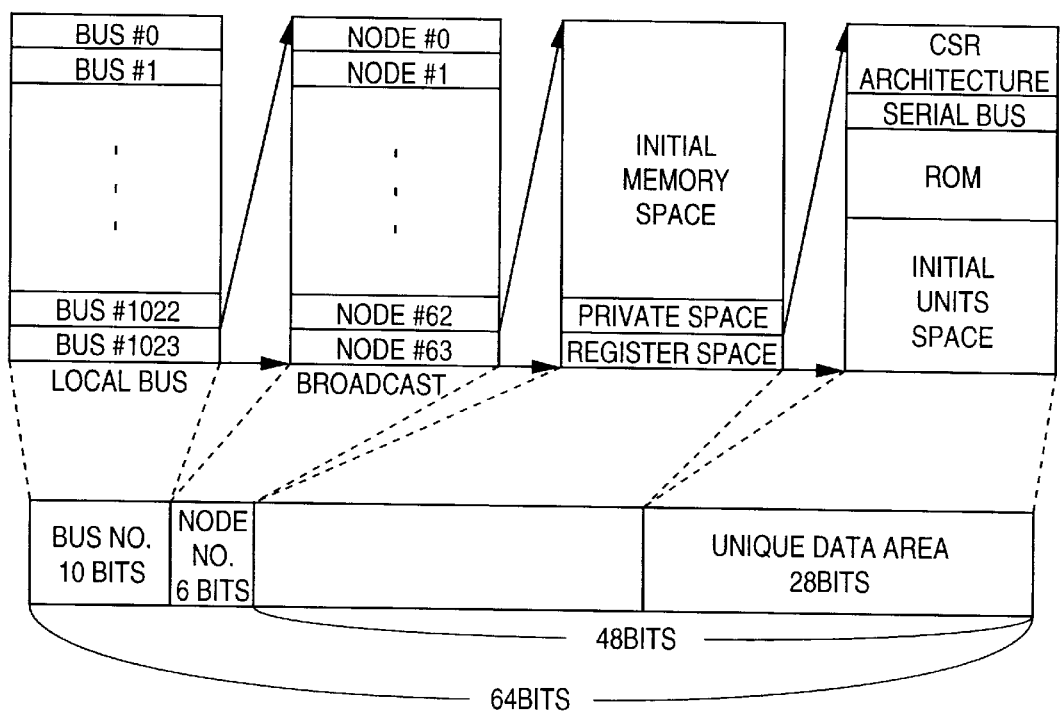
FIG. 18 is an explanatory view showing address space of the IEEE 1394 serial interface.

FIG. 18 shows address space of the 1394 serial bus. All the devices (nodes) connected to the 1394 serial bus have a unique 64 bit address. The 64 bit address is stored in a memory of the devices. Data communication with a designated destination device can be performed by always recognizing the node addresses of the transmitting- and receiving-side nodes.

Addressing of the 1394 serial bus is made based on the IEEE 1212 standards, such that first 10 bits are allocated for designating a bus number, then next 6 bits are allocated for designating an node ID.

48-bit address used in the respective devices are divided into 20 bits and 28 bits, and utilized in the unit of 256 Mbytes. In the initial 20-bit address space, "0" to "0xFFFFD" is called a memory space; "0xFFFFE", a private space; "0xFFFFF", a register space. The private space is an address freely used in the device. The register space, holding information common to the devices connected with the bus, is used for communication among the respective devices.

In the register space, the initial 512 bytes are assigned to a register core (CSR core) as a core of a Command/Status Register (CSR) architecture; the next 512 bytes, to a register of the serial bus; the next 1024 bytes, to a configuration ROM; and the remaining bytes, to a register unique to the device in a unit space.

Generally, for the sake of simplification of bus system design for different node types, it is preferable that only the initial 2048 bytes are used for the nodes, and as a result, total 4096 bytes are used including the initial 2048 bytes for the CSR core, the register of the serial bus, the configuration ROM and the unit space.

The 1394 serial bus has the construction as described above. Next, the features of the 1394 serial bus will be described in more detail.

Detail Description of 1394 Serial Bus
<<Electrical Specification of 1394 Serial Bus>>

Figure 19:
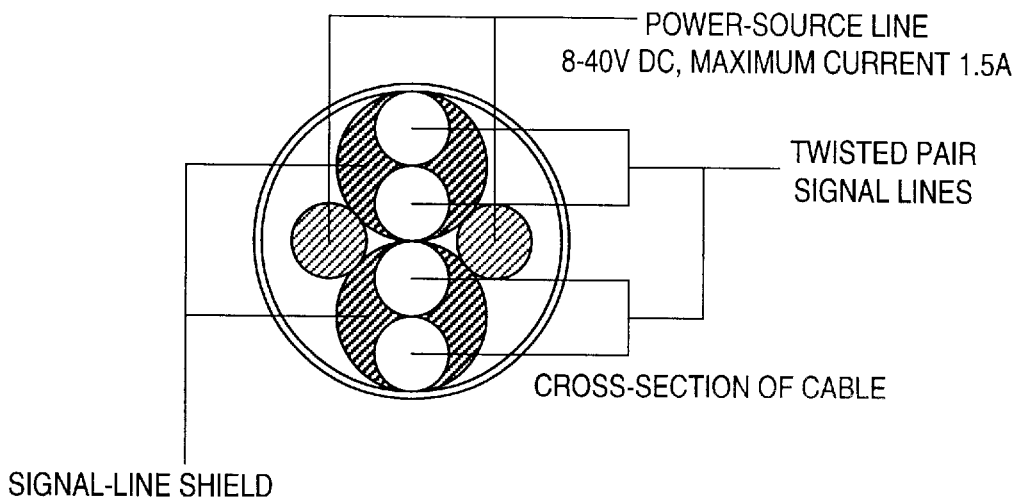
FIG. 19 is a cross-sectional view showing a cable for the IEEE 1394 serial interface.

FIG. 19 shows a cross-section of the cable of the 1394 serial bus. The 1394 serial cable comprises two sets of twisted pair signal lines and two power-source lines. This construction enables power supply to a device which lacks a power source, or a device where a voltage is degraded due to a failure or the like. The direct-current voltage supplied by the power-source lines is 8 to 40V; the current is maximum 1.5 A. Note that in the standards for so-called DV cable, four lines except the power-source line construct the cable.

<<DS-Link>>

Figure 20:
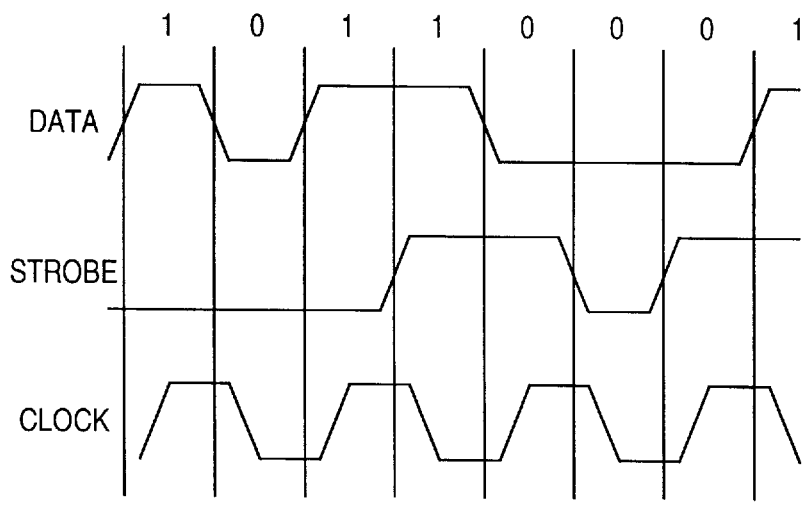
FIG. 20 is a timing chart explaining a Data/Strobe Link method.

FIG. 20 is a timing chart explaining a DS-Link (Data/Strobe-Link) method as a data transfer method.

The DS-Link method, appropriate for high-speed serial data communication, requires two sets of two signal lines. That is, one of the two sets of twisted-pair signal lines is used for sending a data signal, and the other one set of twisted-pair signal lines is used for sending a strobe signal. On the receiving side, an EXCLUSIVE-OR between the data signal and the strobe signal is obtained so as to generate a clock signal. In the DS-Link transfer, it is unnecessary to mix a clock signal into a data signal, therefore, transfer efficiency is higher than that in other serial-data transfer methods. Further, as a clock signal is generated from the data signal and the strobe signal, a phase locked loop (PLL) circuit can be omitted, which attains downsizing of the scale of a controller LSI. Further, in the DS-Link transfer, it is unnecessary to send information indicative of idle status when there is no data to be transferred, therefore, a transceiver of each device can be set in a sleep status, which reduces electric consumption.

<<Bus-Reset Sequence>>

The respective devices (nodes) connected to the 1394 serial bus are provided with a node ID, and are recognized as nodes constructing the network. For example, when increase/decrease of the number of nodes due to connection/disconnection or power ON/OFF status of network devices, i.e., network construction changes and it is necessary to recognize a new network construction, the respective nodes detect the change of network construction, send a bus-reset signal onto the bus, and enter a mode for recognizing the new network construction. The detection of change of network construction is made by detecting change of bias voltage at the connector port 810.

When the bus-reset signal is sent from one node, the physical layer 811 of the respective nodes receives the bus-reset signal, and at the same time, notifies the link layer 812 of the occurrence of bus reset, and forwards the bus-reset signal to the other nodes. When all the nodes have received the bus-reset signal, a bus-reset sequence is started. Note that the bus-reset sequence is started when the cable is attached/detached, or the hardware unit 800 has detected network abnormality or the like. Further, the bus-reset sequence is also started by a direct instruction to the physical layer 811 such as host control by a protocol. As the bus-reset sequence is started, data transfer is suspended during the bus reset, and after the bus reset, the data transfer is restarted in the new network construction.

<<Node-ID Determination Sequence>>

After the bus reset, the respective nodes start to obtain a node ID so as to construct a new network construction. A general sequence from the bus reset to node-ID determination will be described with reference to the flowcharts of FIGS. 21 to 23.

Figure 21:
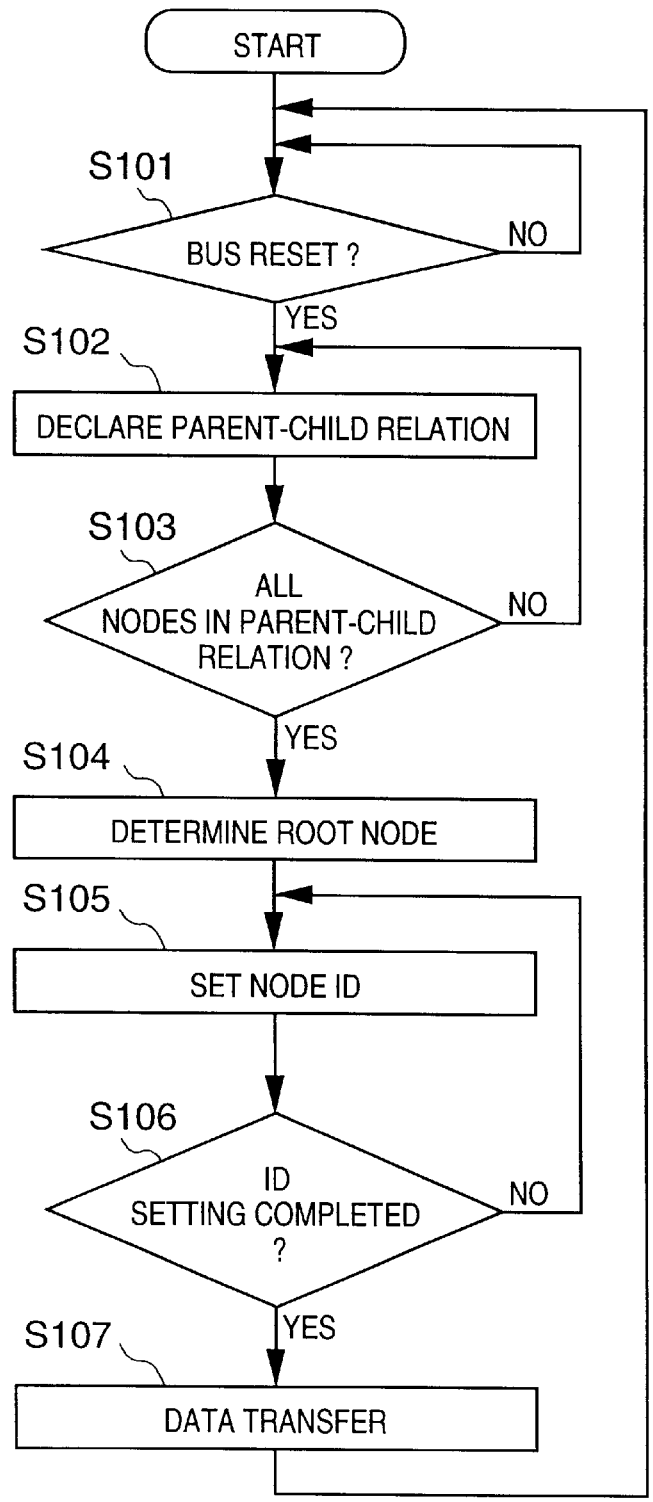
FIGS. 21 to 23 are flowcharts showing a procedure of network construction in the IEEE 1394 serial interface.

FIG. 21 is a flowchart showing a sequence from occurrence of bus-reset signal to node-ID determination and data transfer. At step S101, the respective nodes always monitor occurrence of bus-reset signal. When the bus-reset signal has occurred, the process proceeds to step S102, at which to obtain a new network construction in a state where the network construction has been reset, parent-child relation is declared between nodes connected to each other. Step S102 is repeated until it is determined at step S103 that the parent-child relation has been determined among all the nodes.

As the parent-child relation has been determined, the process proceeds to step S104, at which one "root (node)" is determined. At step S105, node-ID setting is performed so as to provide an ID to the respective nodes. The node-ID setting is made in a predetermined order of the nodes. Step S105 is repeated until it is determined at step S106 that the ID's have been given to all the nodes.

As the node-ID setting has been completed, since the new network construction has been recognized by all the nodes, data transfer among the nodes is possible. At step S107, data transfer is started, and the process returns to step S101, at which occurrence of bus-reset signal is monitored again.

Figure 22:
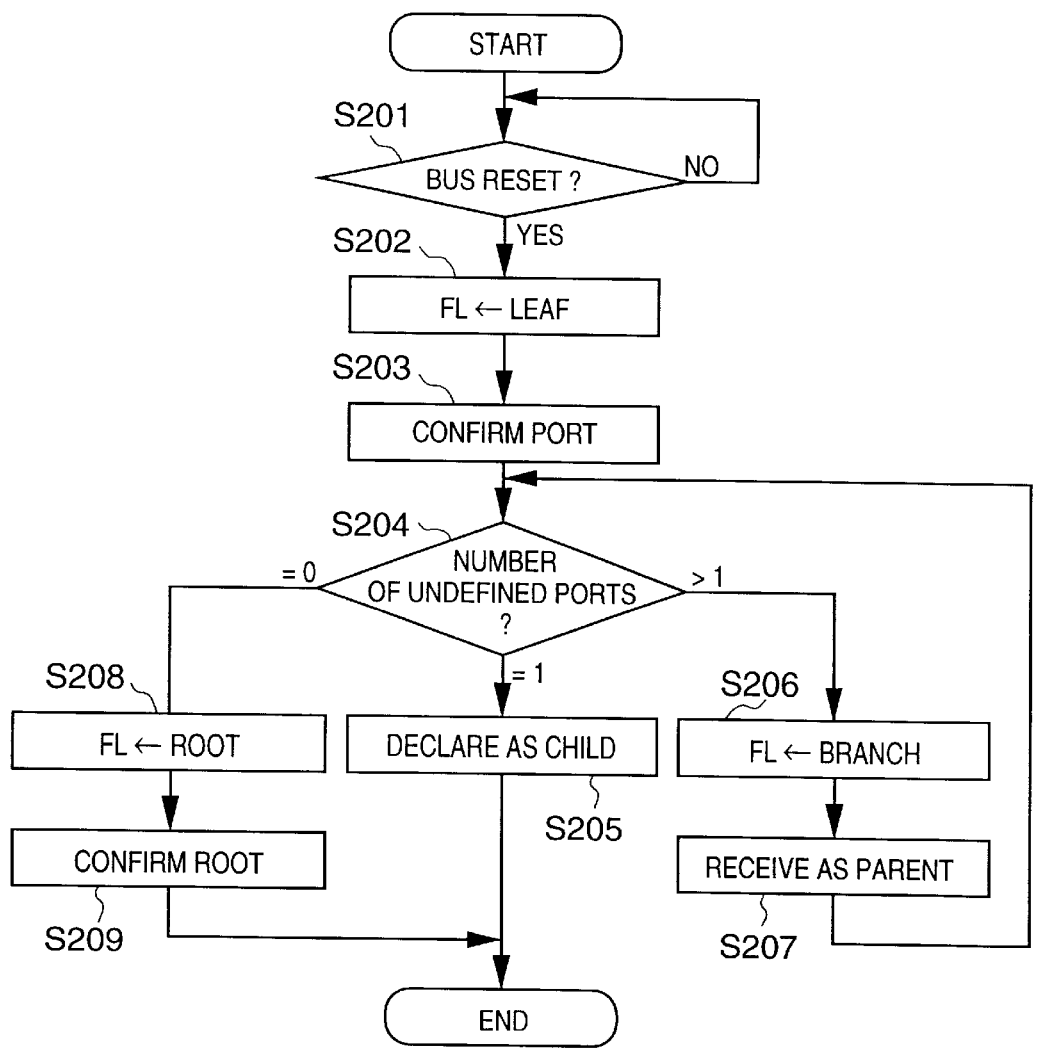
Figure 23:
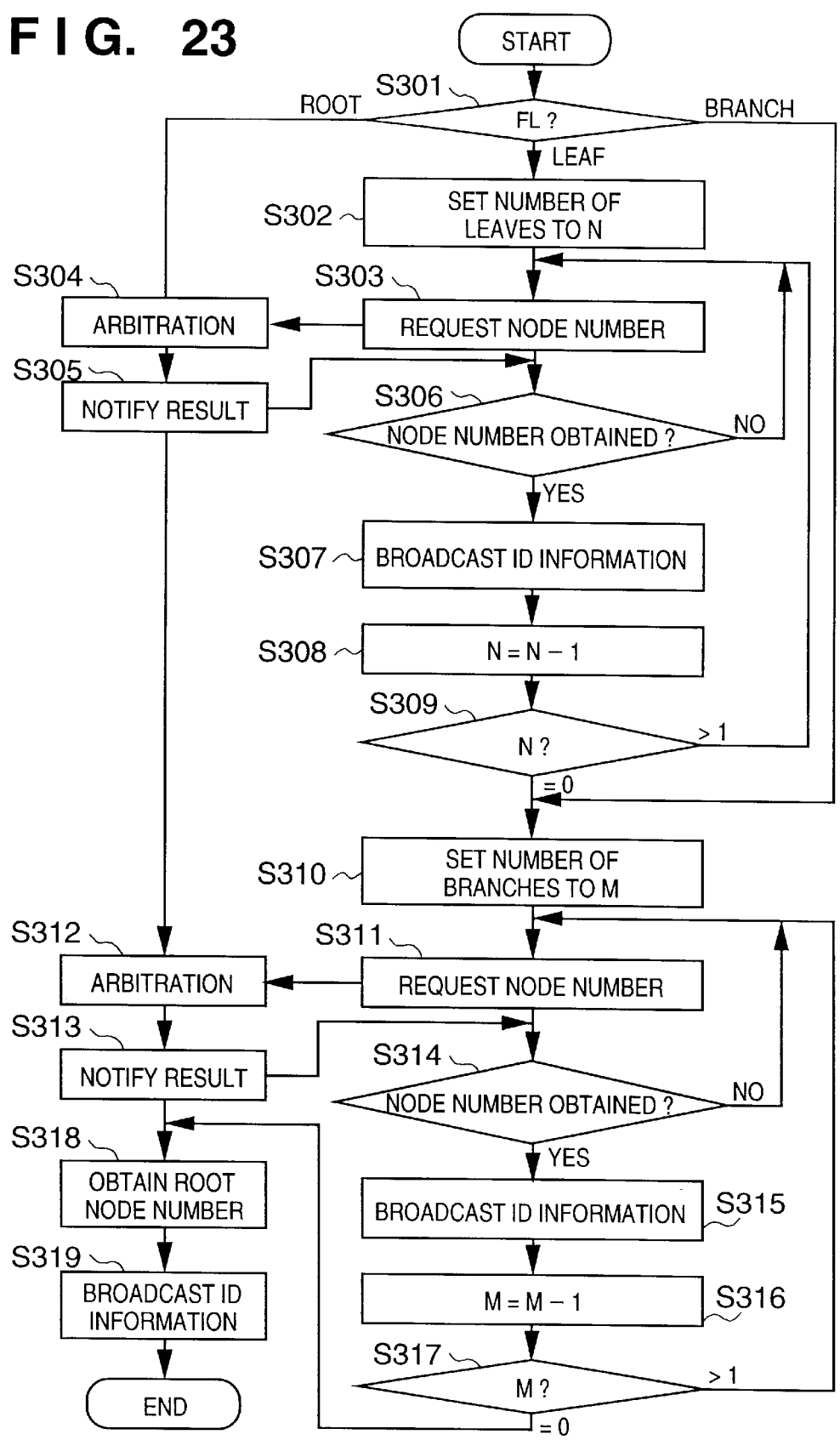

FIG. 22 is a flowchart showing the sequence from the monitoring of bus-reset signal (S101) to the root determination (S104) in detail. FIG. 23 is a flowchart showing the node-ID setting (S105 and S106) in detail.

In FIG. 22, at step S201, the occurrence of busreset signal is monitored, and as the bus-reset signal has occurred, the network construction is reset. Next, at step S202, as a first step for re-recognizing the reset network construction, the respective devices reset its flag FL with data indicative of "leaf (node)". At step S203, the respective devices examine the number of ports, i.e., the number of other nodes connected to them. At step S204, based on the result of examination at step S203, the devices examine the number of undefined (i.e., parent-child relation has not been determined) ports. The number of undefined ports is equal to that of the ports immediately after the bus reset, however, with the progress of determination of parent-child relation, the number of undefined ports detected at step S204 decreases.

Only actual leaf(ves) can declare parent-child relation immediately after the bus reset. Whether or not the node is a leaf is detected from the number of ports examined at step S203; i.e., if the number of ports is "1", the node is a leaf. The leaf declares that "this node is a child, and the connected node is a parent" at step S205, then terminates the operation.

On the other hand, a node that detected at step S203 that the number of ports is "two or more" is a "branch". Immediately after the bus reset, as "undefined ports >1" holds, the process proceeds to step S206, at which the flag FL is set with data indicative of "branch", then declaration of parent-child relation from another node is waited at step S207. When the parent-child relation is declared from another node, the process returns to step S204 at which the branch examines the number of undefined ports. If the number of undefined ports is "1", the branch can declare at step S205 that "this node is a child, and the connected node is a parent" to the node connected to the remaining port. If the number of undefined ports is still "two or more", the branch waits for declaration of parent-child relation from another node at step S207.

When any one of the branches (or exceptionally leaf(ves) which delayed declaring a child) detects that the number of undefined ports is "0", the parent-child declaration of the overall network has been completed. The only node that has "0" undefined port, i.e., the parent of all the nodes, sets the flag FL with data indicative of a "root" at step S208. Then at step S209, the node is recognized as a root.

In this manner, the procedure from the bus reset to the parent-child declaration among all the nodes in the network ends.

Next, a procedure of providing each node with an ID will be described. First, the ID setting is performed at the leaves. Then, ID's are set in numerical order (from node number: 0) from leaves→branches→root.

In FIG. 23, at step S301, the process splits in accordance with node type, i.e., leaf, branch or root, based on the data set at the flags FL.

In case of leaf, at step S302, the number of leaves (natural number) in the network is set to a variable N. At step S303, the respective leaves request a node number to the root. If a plurality of requests have been made, the root performs arbitration at step S304, and provides a node number to one node at step S305, while notifies the other nodes of the result of acquisition of node-number indicating that the node number has been failed.

A leaf that has not obtained a node number (NO at step S306) repeats the request for node number at step S303. On the other hand, a leaf that has obtained a node number notifies all the nodes of the obtained node number by broadcasting ID information including the node number. As the broadcasting of the ID information has been completed, the variable N indicative of the number of leaves is decremented at step S308. Then, from the determination at step S309, the procedure from step S303 to step S308 is repeated until the variable N becomes "0" in the determination at step S309. When ID information on all the leaves have been broadcasted, the process proceeds to step S310, for setting ID's of branches.

The ID setting for branches is. performed substantially similar to the ID setting for the leaves. First, at step S310, the number of branches (natural number) is set to a variable M. At step S311, the respective branches request the root for a node number. In response to the requests, the root performs arbitration at step S312, and provides a node number, subsequent to the last leaf node number, to a branch at step S313, while notifies the other branches of the result of acquisition of node-number indicating that the node number has been failed.

A branch that has not obtained a node number (NO at step S314) repeats the request for node number at step S315. On the other hand, a branch that has obtained a node number notifies all the nodes of the obtained node number by broadcasting ID information including the node number. As the broadcasting of the ID information has been completed, the variable M indicative of the number of branches is decremented at step S316. Then, from the determination at step S317, the procedure from step S311 to step S316 is repeated until the variable M becomes "0" in the determination at step S317. When ID information on all the leaves have been broadcasted, the process proceeds to step S318, for setting the ID of the root.

At this time, it is only the root that has not obtained a node ID. At step S318, the root obtains the smallest number that has not been provided to any other node as the node ID of the root, and at step S319, broadcasts ID information on the root.

As described above, the procedure until the node ID's for all the nodes have been set ends. Next, the sequence of node ID determination will be described with reference to the network example shown in FIG. 24.

Figure 24:
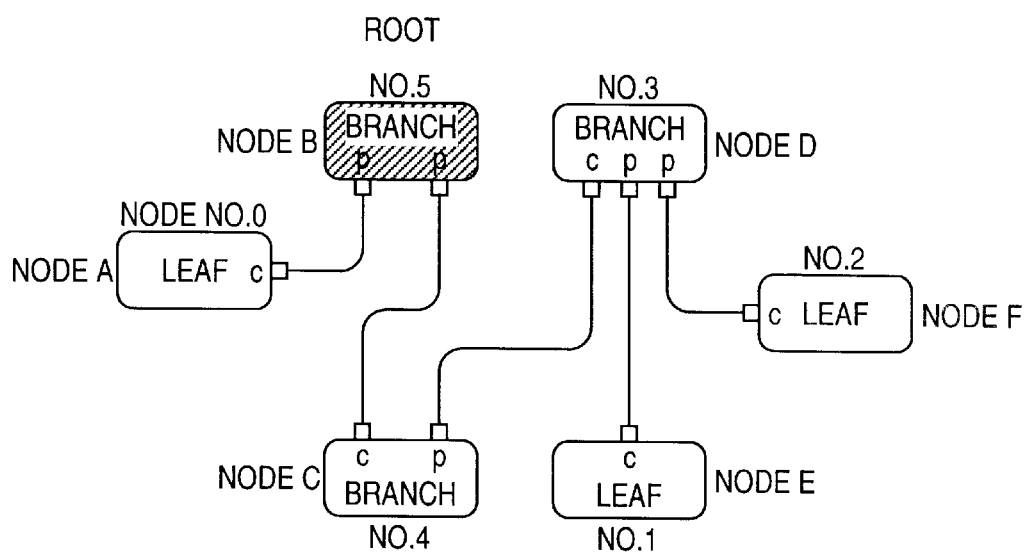
FIG. 24 is a block diagram showing an example of the network.

In the network in FIG. 24, a node B as a root is directly connected to its lower nodes A and C; the node C is directly connected to its lower node D; and the node D is directly connected to its lower nodes E and F. The procedure of determining this hierarchical structure, the root node and the node ID's will be described below.

After the bus reset has occurred, to recognize connection statuses of the respective nodes, parent-child relation is declared between ports of directly connected nodes. "parent" means a node at an upper level and "child" means a node at a lower level in the hierarchical structure. In FIG. 24, the node that first declared parent-child relation after the bus reset is the node A. As described above, nodes (leaves) where only one port is connected can start declaration of parent-child relation. That is, if the number of ports is "1", it is recognized that the node is the end of the network tree, i.e., a leaf. The declaration of parent-child relation is started from the leaf which has first taken action among these leaves. Thus, a port of the leave node is set as a "child", while the port of another node connected to the leave node is set as a "parent". In this manner, "child-parent" relation is sequentially set between the nodes A and B, between the nodes E and D, and between the nodes F and D.

Further, among upper nodes having a plurality of ports, i.e., branches, parent-child relation is sequentially declared with respect to upper node(s) from the node that first received declaration of parent-child relation from the leaf. In FIG. 24, first parent-child relation is determined between the nodes D and E and between the nodes D and F. Then the node D declares parent-child relation with respect to the node C, and as a result, a relation "child-parent" is set between the nodes D and C. The node C, that has received the declaration of parent-child relation from the node D, declares parent-child relation with respect to the node B connected to the other port, thus "child-parent" relation is set between the nodes C and B.

In this manner, the hierarchical structure as shown in FIG. 24 is constructed. The node B, that has finally become the parent at all the ports, is determined as a root. Note that a network has only one root. In a case where the node B that has received declaration of parent-child relation from the node A immediately declares parent-child relation with respect to another node, the other node, e.g., the node C, may be the root node. That is, any node may be a root depending upon timing of transmitting declaration of parent-child relation, and further, even in a network maintaining the same construction, a particular node is not always become a root.

As the root has been-determined, the sequence of determining the respective node ID's is started. Each node has a broadcast function to notify its ID information to all the other nodes. ID information includes a node number, information on a connected position, the number of ports, the number of ports connected to other nodes, information on parent-child relation on the respective ports and the like.

As described above, the assignment of node numbers is started from the leaves. In numerical order, node number=0, 1, 2, . . . is assigned. Then, by the broadcasting of ID information, it is recognized that the node number has been assigned.

As all the leaves have obtained a node number, node numbers are assigned to the branches. Similar to the assignment of node numbers to the leaves, ID information is broadcasted from the branch that received a node number, and finally, the root broadcasts its ID information. Accordingly, the root always has the larger node number.

Thus, as the ID setting of the overall hierarchical structure has been completed and the network has been constructed, then the bus initialization is completed.

<<Control Information for Node Management>>

The CSR core as shown in FIG. 18 exists on the register as a basic function of the CSR architecture for node management. FIG. 25 shows the positions and functions of the registers. In FIG. 25, the offset is a relative position from "0xFFFFF0000000".

In the CSR architecture, the register for the serial bus is arranged from "0xFFFFF0000200". FIG. 26 shows the positions and functions of the registers.

Further, information on node resources of the serial bus is arranged from "0xFFFFF0000800". FIG. 27 shows the positions and functions of the registers.

The CSR architecture has a configuration ROM for representing functions of the respective nodes. The configuration ROM has a minimum format and a general format, arranged from "0xFFFFF0000400". As shown in FIG. 28, the minimum format configuration ROM merely shows a vendor ID which is a unique numerical value represented by 24 bits.

As shown in FIG. 29, the general format configuration ROM has information on a node. In this case, the vendor ID in this format is included in a "root_directory". Further, "bus_info_block" and "root&unit_leaves" include unique device number including the vendor ID, represented by 64 bits. The device number is used after network reconstruction by bus reset operation, to continue recognition of the node.

<<Serial Bus Management>>

As shown in FIG. 17, the protocol of the 1394 serial bus comprises a physical layer 811, a link layer 812 and a transaction layer 814. This provides, as the serial bus management, a basic function for node management and bus resource management, based on the CSR architecture.

Only one node which performs bus management (hereinafter referred to as "bus management node") exists on the same bus, and provides the other nodes on the serial bus with management function which includes cycle master control, performance optimization, power source management, transmission speed management, construction management and the like.

The bus management function briefly divides into a bus manager, an isochronous resource manager and a node control function. The node control is a management function which enables communication among the nodes in the physical layer 811, the link layer 812, the link layer 812, the transaction layer 814 and an application program by the CSR. The isochronous resource manager, which is a management function necessary for isochronous-type data transfer on the serial bus, manages assignment of transfer bandwidth and channel number to isochronous data. For this management, after bus initialization, the bus management node is dynamically selected from nodes having the isochronous resource manager function.

Further, in a construction without a bus management node on the bus, a node having the isochronous resource manager function performs a part of the bus management such as the power source management and cycle master control. Further, the bus management is a management function as service to provide a bus control interface to an application program. The control interface uses a serial-bus control request (SB_CONTROL.request), a serial-bus event control confirmation (SB_CONTROL.confirmation) and a serial-bus event indication (SB_EVENT.indication).

The serial-bus control request is shown in FIG. 27 as SB_CONTROL.req, and used when an application program requires the bus management node to perform bus reset, bus initialization, representation of bus-status information, and the like.

The serial-bus event control confirmation is, shown in FIG. 27 as SB_CONTROL.conf, the result of the serial-bus control request, and is notified from the bus management node to the application for confirmation.

The serial-bus event control confirmation is, shown in FIG. 27 as SB_EVENT.ind, made as notification of an asynchronously-caused event from the bus management node to the application.

<<Data Transfer Protocol>>

The data transfer by using the 1394 serial bus simultaneously sends isochronous data (isochronous packet) which must be periodically transmitted, and asynchronous data (asynchronous packet) which can be transmitted/received at arbitrary timing, further, ensures real-time transmission of isochronous data. In the data transfer, a bus use right is requested prior to transfer, and bus arbitration is performed to obtain bus use permission.

In the asynchronous transfer, a transmitting node ID and a receiving node ID are sent with transfer data as packet data. The receiving node confirms the receiving node ID, i.e., its node ID, receives the packet, and returns an acknowledge signal to the transmitting node. Thus, one transaction is completed.

In the isochronous transfer, a transmitting node requires an isochronous channel with a transmission speed, and a channel ID is sent with transfer data as packet data. A receiving node confirms a desired channel ID and receives the data packet. The necessary channel number and transmission speed are determined by the application layer 816.

<<Asynchronous Sub-action>>

The asynchronous transfer mode (ATM) which is one of the data transfer modes with 1394 serial bus will be described below.

Figure 30:
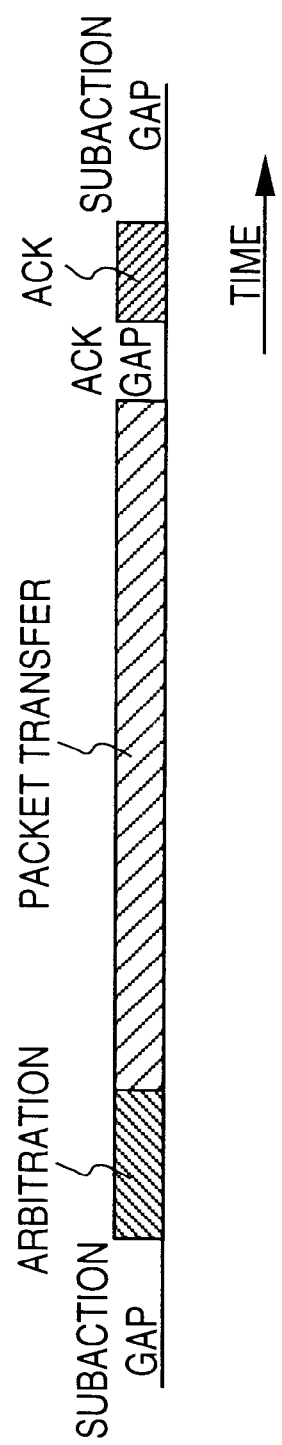
FIG. 30 is a timing chart showing transitional statuses in asynchronous data transfer.

The asynchronous sub-action is asynchronous data transfer. FIG. 30 shows transition in the asynchronous transfer. In FIG. 30, the first sub-action gap represents the idle status of the bus. At a point where the idle time has become a predetermined value, a node which is to perform data transfer requests a bus use right, then bus arbitration is executed.

When the use of bus has been allowed by the arbitration, data in the form of packet is transferred, and a node which receives the data sends a reception acknowledgment code ACK as a response, or sends a response packet after a short gap called ACK gap, thus the data transfer is completed. The code ACK comprises 4-bit information and a 4-bit checksum. The code ACK, including information indicative of success, busy or pending status, is immediately sent to the data-sender node.

Figure 31:
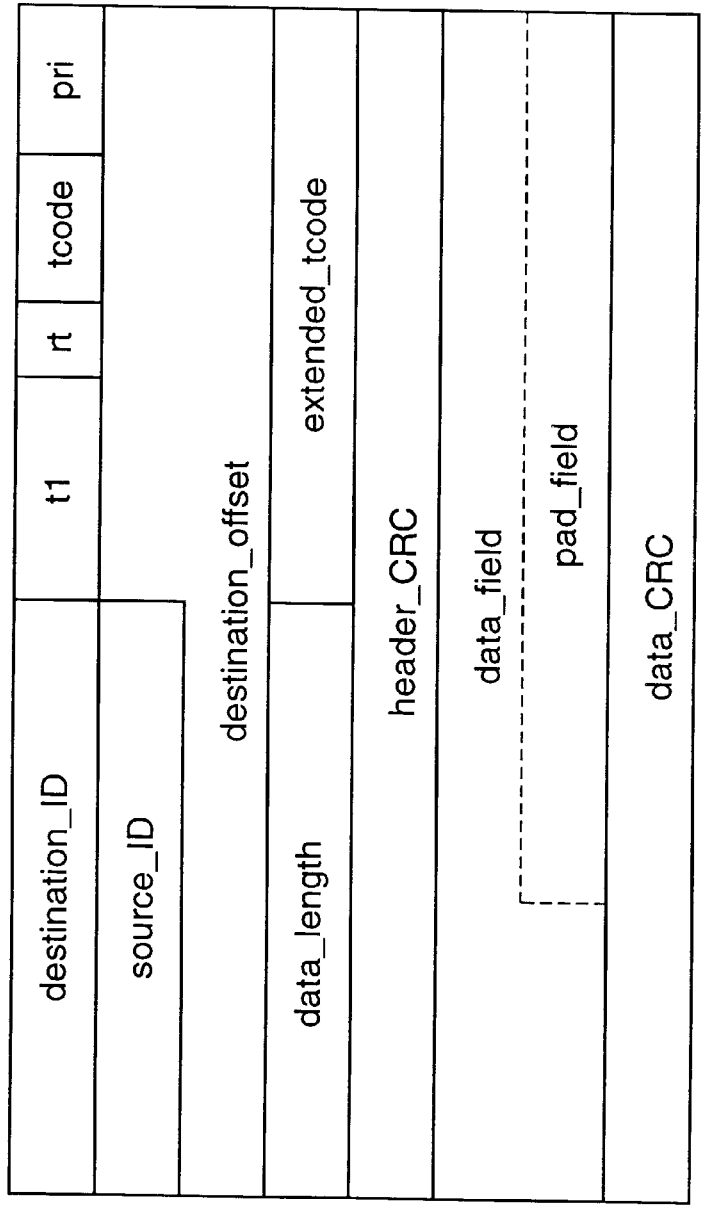
FIG. 31 is a diagram showing a packet format for the asynchronous transfer.

FIG. 31 shows a packet format for asynchronous transfer. The packet has a data area, a data CRC area for error correction, and a header area in which a destination node ID, a source node ID, a transfer data length and various codes are written.

The asynchronous transfer is one-to-one communication from a sender node to a receiver node. A packet sent from the sender node is relayed by the respective nodes in the network, however, as these nodes are not designated as the receiver of the packet, they ignore the packet, then only the receiver node designated by the sender node receives the packet.

<<Isochronous Sub-action>>

The isochronous transfer mode (ITM) which is an another data transfer modes with 1394 serial bus will be described below.

The isochronous sub-action is isochronous data transfer. Isochronous transfer, which can be regarded as the greatest feature of the 1394 serial bus is appropriate to multimedia data transfer which requires realtime transfer of, especially, AV data.

Further, the asynchronous transfer is one-to-one transfer, whereas the isochronous transfer is broadcasting transfer from one sender node to all the other nodes.

Figure 32:
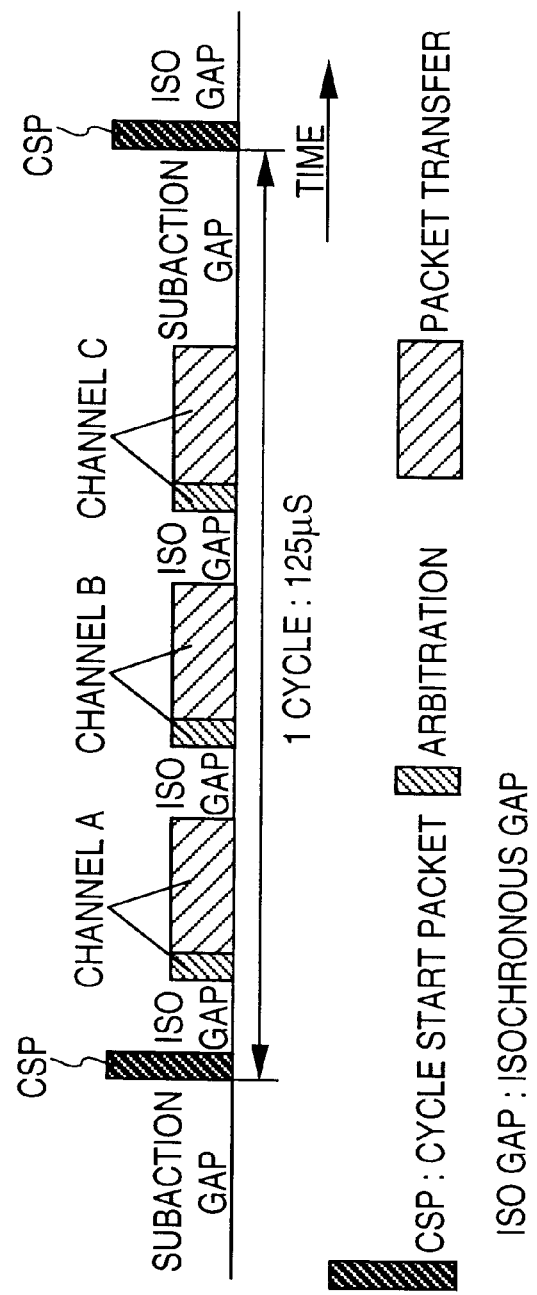
FIG. 32 is a timing chart showing transitional statuses in isochronous data transfer.

FIG. 32 shows transition in the isochronous transfer. The isochronous transfer is executed on the bus in a predetermined cycle, called "isochronous cycle". The period of the isochronous cycle is 125 ms. A cycle start packet (CSP) indicates the start of the isochronous cycle for synchronizing the operations of the respective nodes. When data transfer in a cycle has been completed and a predetermined idle period (sub-action gap) has elapsed, a node which is called "cycle master" sends the .CSP indicative of the start of the next cycle. That is, this interval between the issuance of CSP's is 125 ms.

As channel A, channel B and channel C in FIG. 32, the respective packets are provided with a channel ID, so that plural types of packets can be independently transferred within one isochronous cycle. This enables substantially-realtime transfer among the plural nodes. The receiver node can receive only data with a predetermined channel ID. The channel ID does not indicate an address of the receiving node, but merely indicates a logical number with respect to the data. Accordingly, one packet sent from a sender node is transferred to all the other nodes, i.e., broadcasted.

Similar to the asynchronous transfer, bus arbitration is performed prior to the packet broadcasting in isochronous transfer. However, as the isochronous transfer is not one-to-one communication like the asynchronous transfer, the reception acknowledgment code ACK used as a response in the asynchronous transfer is not used in the isochronous transfer.

Further, an isochronous gap (iso gap) in FIG. 32 represents an idle period necessary for confirming prior to isochronous transfer that the bus is in idle status. If the predetermined idle period has elapsed, bus arbitration is performed with respect to node(s) desiring isochronous transfer.

Figure 33:
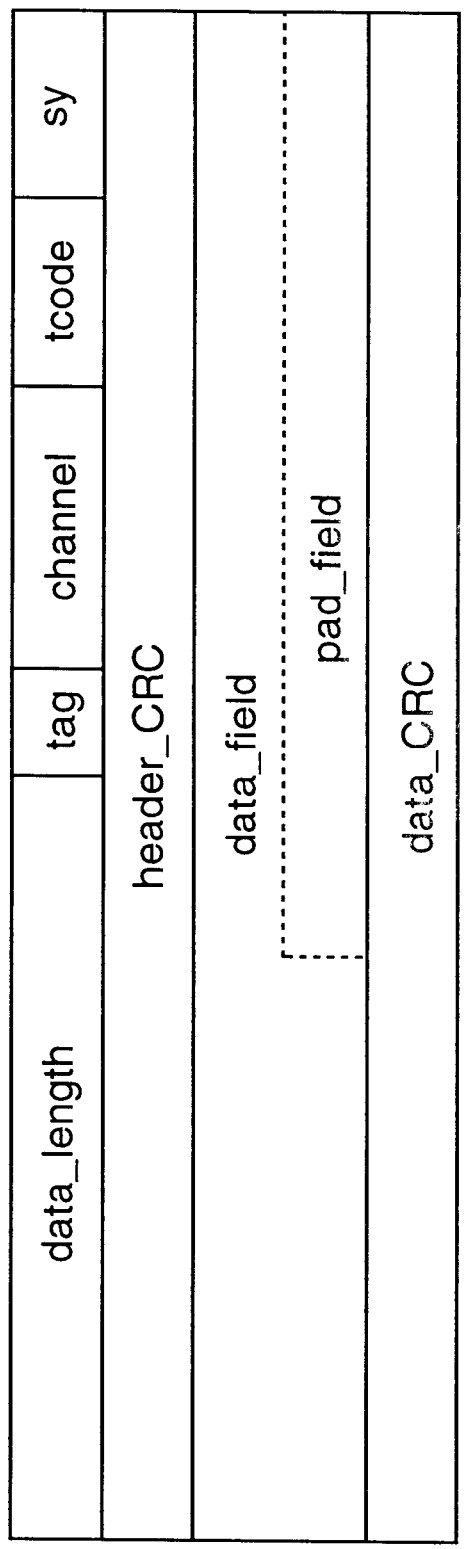
FIG. 33 is a diagram showing a packet format for the isochronous transfer.

FIG. 33 shows a packet format for isochronous transfer. Various packets divided into channels respectively have a data field, a data CRC field for error correction and a header field containing information such as a transfer-data length, a channel No., various codes and error-correction header CRC as shown in FIG. 34.

<<Bus Cycle>>

Figure 35:
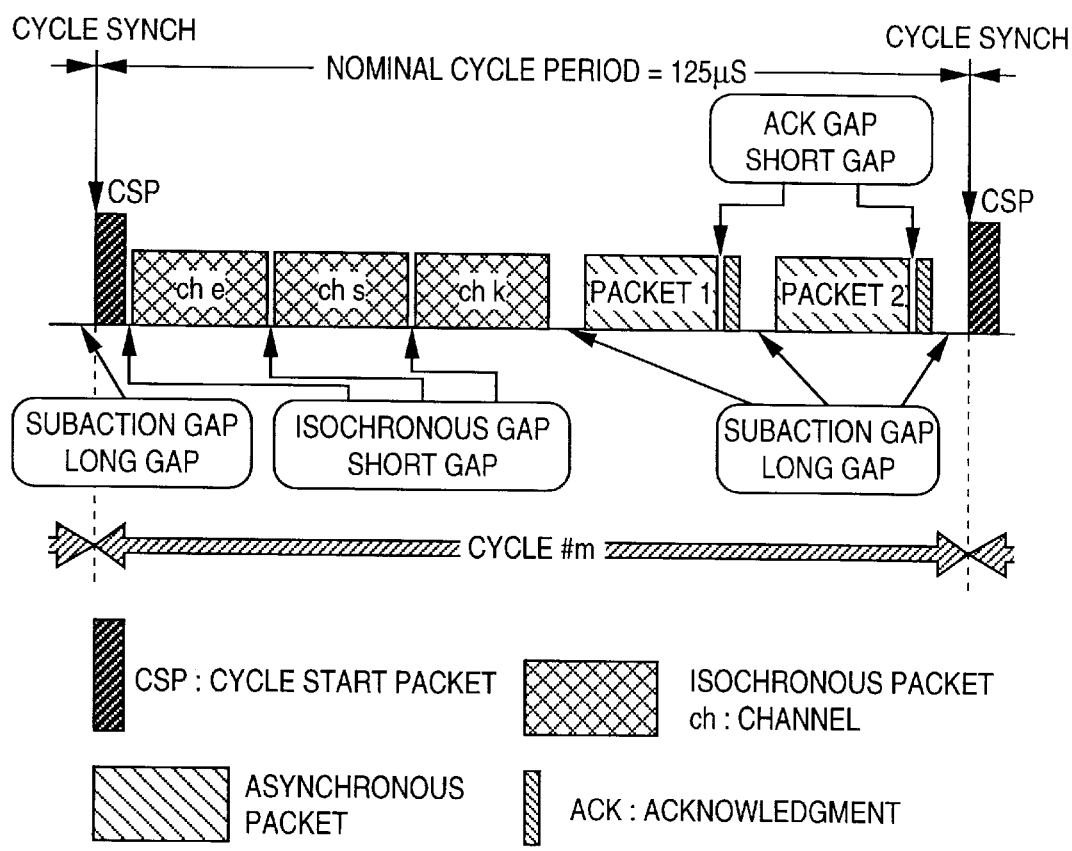
FIG. 35 is a timing chart showing transitional statuses in data transfer on the bus when the isochronous transfer and asynchronous transfer are mixedly performed.

In practice, both isochronous transfer and asynchronous transfer can be mixedly performed on the 1394 serial bus. FIG. 35 shows transition in the isochronous transfer and asynchronous transfer mixedly performed on the 1394 serial bus.

The isochronous transfer is performed prior to the asynchronous transfer because after the CSP, the isochronous transfer can be started with a gap (isochronous gap) shorter than the idle period necessary for starting the asynchronous transfer. Accordingly, the isochronous transfer has priority over the asynchronous transfer.

In the typical bus cycle as shown in FIG. 35, upon starting the cycle#m, a CSP is transferred from the cycle master to the respective nodes. The operations of the respective nodes are synchronized by this CSP, and node(s) that waits for a predetermined idle period (isochronous gap) to perform isochronous transfer participates in bus arbitration, then starts packet transfer. In FIG. 35, a channel e, a channel s and a channel k are transferred by the isochronous transfer.

The operation from the bus arbitration to the packet transfer is repeated for the given channels, and when the isochronous transfer in the cycle#m has been completed, the asynchronous transfer can be performed. That is, when the idle period has reached the sub-action gap for the asynchronous transfer, node(s) that is to perform the asynchronous transfer participates in bus arbitration. Note that only if the sub-action gap for starting the asynchronous transfer is detected, after the completion of isochronous transfer and before the next timing to transfer the CSP (cycle synch), the asynchronous transfer can be performed.

In the cycle#m in FIG. 35, the isochronous transfer for three channels is performed, and then two packets (packet 1 and packet 2) including ACK are transferred by the asynchronous transfer. When the asynchronous packet 2 has been transferred, as the next cycle synch point to start the subsequent cycle m+1 comes, the transfer in the cycle#m ends. Note that during the asynchronous or isochronous transfer, if the next cycle synch point to transfer the next CSP has come, the transfer is not forcibly stopped but continued. After the transfer has been completed, a CSP for the next cycle is transferred after a predetermined idle period. That is, when one isochronous cycle is continued for more than 125 ms, the next isochronous cycle is shorter than the reference period 125 ms. In this manner, the isochronous cycle can be lengthened or shortened based on the reference period 125 ms.

However, it may be arranged such that the isochronous transfer is performed in every cycle, while the asynchronous transfer is sometimes postponed until the next cycle or the cycle further subsequent to the next cycle, so as to maintain realtime transfer. The cycle master also manages information on such delay.

Thus, in accordance with the fifth embodiment as described that the plural devices are connected by the 1394 serial bus, the appropriate power distribution which described in from the first to fourth embodiments can be realized.

The fifth embodiments have been described in a case where a network is constructed by using the serial bus based on the IEEE 1394 standards, however, the present invention is not limited to the 1394 serial bus. For example, the present invention is applicable to a network constructed by using an arbitrary serial interface such as a Universal Serial Bus (USB).

As many apparently widely different embodiments of the present invention can be made without departing from the spirit and scope thereof, it is to be understood that the invention is not limited to the specific embodiments thereof except as defined in the appended claims.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment/embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

What is claimed is:

1. A power control system, comprising:
   device connecting unit for connecting a plurality of devices for transferring data and supplying power between said connected plurality of devices;
   distribution deciding unit for deciding distribution of power to each of said plurality of devices based upon power information in each device when power consumption exceeds a predetermined level while a connection status is unchanged; and
   mode control unit for controlling a power consumption mode of each device in accordance with the distribution of power decided by said distribution deciding unit.

2. The system according to claim 1, wherein said power source is an AC external power source.

3. The system according to claim 1, wherein sum total of power distributed to each of said devices is less than a predetermined value.

4. The system according to claim 1, wherein the power consumption mode includes a mode in which the power source of the device is turned off.

5. The system according to claim 1, wherein said distribution deciding unit decides distribution of power based upon a degree of priority set for each device in advance.

6. The system according to claim 5, wherein the degree of priority is set for every power consumption mode of each device.

7. The system according to claim 1, wherein said distribution deciding unit decides a distribution of power so as to maximize the number of devices that operate.

8. The system according to claim 1, wherein said distribution deciding unit decides the distribution of power to each device when the device is connected to said power source line.

9. The system according to claim 1, wherein said distribution deciding unit decides the distribution of power to each device when power is introduced to the device, which has been connected to said power source line.

10. The system according to claim 1, wherein said mode controller changes the power consumption modes of said plurality of devices all at one time.

11. The system according to claim 1, further comprising first multiplexer for multiplexing the power information onto said power source line;
   said distribution deciding unit deciding distribution of power to each device based upon the power information multiplexed by said first multiplexer.

12. The system according to claim 10, wherein in a case where a power consumption mode is changed so as to reduce power consumption in any device of said plurality of devices, said mode controller changes the power consumption mode only of said device.

13. The system according to claim 11, further comprising a second multiplexer for multiplexing a power control signal, which is based upon the distribution of power decided by said distribution deciding unit, onto said power source line;
   said mode controller having unit for controlling the power consumption mode of each device based upon the power control signal.

14. The system according to claim 11, wherein said first multiplexer multiplexes a change request, which is for requesting a change of power consumption mode, onto said power source line; and
   said distribution deciding unit decides distribution of power to each device based upon the change request.

15. The system according to claim 11, wherein said first multiplexer multiplexes change schedule information, which is for scheduling a change of power information, onto said power source line; and
   said distribution deciding unit and said mode controller schedule distribution of power to each device and control of the power consumption of each device based upon the change schedule information.

16. The system according to claim 11, wherein said first multiplexer monitors power consumption of each device at prescribed time intervals and multiplexes results of monitoring onto said power source line; and
   said distribution deciding unit decides distribution of power to each device based upon the results of monitoring.

17. The system according to claim 11, wherein in a case where power consumption of each device has changed by more than a predetermined amount, said first multiplexer multiplexes power consumption information indicative of the changed power consumption onto said power source line; and
   said distribution deciding unit decides distribution of power to each device based upon this power consumption information.

18. The system according to claim 17, wherein said power source line comprises a plurality of channels;
   said distribution deciding unit decides, on a per-channel basis, distribution of power to each connected device; and
   said mode controller controls the power consumption mode of each device on a per-channel basis in accordance with the distribution of power decided by said distribution deciding unit.

19. The system according to claim 1, wherein said power source line comprises a plurality of channels;
   said distribution deciding unit decides, on a per-channel basis, distribution of power to each connected device; and
   said mode controller controls the power consumption mode of each device on a per-channel basis in accordance with the distribution of power decided by said distribution deciding unit.

20. A power control system, comprising:
   device connecting means for serially connecting a plurality of devices for transferring data and supplying power between said connected plurality of devices;
   distribution deciding means for deciding distribution of power to each of said plurality of devices based upon power information in each device;
   mode control means for controlling a power consumption mode of each device in accordance with the distribution of power decided by said distribution deciding means; and
   first multiplexing means for multiplexing the power information onto said power source line;
   wherein said distribution deciding means deciding distribution of power to each device based upon the power information multiplexed by said first multiplexing means.

21. The system according to claim 20, further comprising second multiplexing means for multiplexing a power control signal, which is based upon the distribution of power decided by said distribution deciding means, onto said power source line;
   said mode control means having means for controlling the power consumption mode of each device based upon the power control signal.

22. The system according to claim 20, wherein said first multiplexing means multiplexes a change request, which is for requesting a change of power consumption mode, onto said power source line; and said distribution deciding means decides distribution of power to each device based upon the change request.

23. The system according to claim 20, wherein said first multiplexing means multiplexes change schedule information, which is for scheduling a change of power information, onto said power source line; and said distribution deciding means and said mode control means schedule distribution of power to each device and control of the power consumption of each device based upon the change schedule information.

24. The system according to claim 20, wherein said first multiplexing means monitors power consumption of each device at prescribed time intervals and multiplexes results of monitoring onto said power source line; and said distribution deciding means decides distribution of power to each device based upon the results of monitoring.

25. The system according to claim 20, wherein in a case where power consumption of each device has changed by more than a predetermined amount, said first multiplexing means multiplexes power consumption information indicative of the changed power consumption onto said power source line; and said distribution deciding means decides distribution of power to each device based upon this power consumption information.

26. The system according to claim 25, wherein the predetermined amount is decided in dependence upon power consumption of each device.

27. A power control system, comprising:

device connecting means for serially connecting a plurality of devices for transferring data and supplying power between said connected plurality of devices;

distribution deciding means for deciding distribution of power to each of said plurality of devices based upon power information in each device; and mode control means for controlling a power consumption mode of each device in accordance with the distribution of power decided by said distribution deciding means;

wherein said power source line comprises a plurality of channels;

said distribution deciding means decides, on a per-channel basis, distribution of power to each connected device; and said mode control means controls the power consumption mode of each device on a per-channel basis in accordance with the distribution of power decided by said distribution deciding means.

28. A power control system for supplying power to a plurality of devices interconnected on a power source line, comprising:

first multiplexing means for multiplexing current drain information in said plurality of devices onto said power source line;

distribution deciding means for deciding distribution of current to each device based upon the current drain information multiplexed by said first multiplexing means;

second multiplexing means for multiplexing a current control signal, which is based upon the distribution of current decided by said distribution deciding means, onto said power source line; and current control means for controlling current supplied, to each device, based upon the current control signal multiplexed by said second multiplexing means.

29. The system according to claim 28, wherein in a case where current drain of each device has changed by more than a predetermined amount, said first multiplexing means multiplexes current drain information indicative of the changed current drain onto said power source line; and said distribution deciding means decides distribution of current to each device based upon this current drain information.

30. The system according to claim 29, wherein the predetermined amount is decided in dependence upon current drain of each device.

31. The system according to claim 28, wherein said power source line comprises a plurality of channels;

said distribution deciding means decides, on a per-channel basis, distribution of current to each connected device; and said current control means controls the current, supplied to each device, on a per-channel basis in accordance with the distribution of current decided by said distribution deciding means.

32. The system according to claim 31, wherein said distribution deciding means judges status of connection of devices in each channel based upon the current drain of each channel.

33. The system according to claim 28, wherein said plurality of devices include an adapter capable of connecting another device that is incompatible with this power control system.

34. The system according to claim 33, wherein said adapter has notification means for giving notification of presently prevailing conditions under which power is being supplied.

35. A power control method for supplying power, comprising the steps of:

connecting a plurality of devices for transferring data and supplying power between said connected plurality of devices;

deciding distribution of power to each of said plurality of devices based upon power information in each device when power consumption exceeds a predetermined level while a connection status is unchanged; and controlling a power consumption mode of each device in accordance with the distribution of power that has been decided.

36. A power control method for supplying power to a plurality of devices interconnected on a power source line, comprising the steps of:

multiplexing current drain information in said plurality of devices onto said power source line;

deciding distribution of current to each device based upon the current drain information that has been multiplexed;

multiplexing a current control signal, which is based upon the distribution of current that has been decided, onto said power source line; and controlling current supplied, to each device, based upon the current control signal that has been multiplexed.

37. A recording medium on which has been recorded program code for power control processing, said program code comprising:

code for deciding distribution of power to each of a plurality of devices interconnected on a power source line based upon power information in each device when power consumption exceeds a predetermined level while a connection status is unchanged; and code for controlling a power consumption mode of each device in accordance with the distribution of power that has been decided.

38. A recording medium on which has been recorded program code for power control processing for supplying power to a plurality of devices interconnected on a power source line, said program code comprising:
- code for multiplexing current drain information in said plurality of devices onto said power source line;
- code for deciding distribution of current to each device based upon the current drain information that has been multiplexed;
- code for multiplexing a current control signal, which is based upon the distribution of current that has been decided, onto said power source line; and
- code for controlling current supplied, to each device, based upon the current control signal that has been multiplexed.

39. A power control system to which a plurality of devices are connected by connecting means for transferring data and supplying power, comprising:
- power-source connecting means for connecting a prescribed device among the plurality of devices to a power source;
- multiplexing means for multiplexing power information in each device onto said connecting means;
- distribution deciding means for deciding distribution of power to each of said plurality of devices based upon the power information multiplexed by said multiplexing means; and
- power control means for supplying power from said prescribed device to the other devices, which are connected via the connecting means, in accordance with the distribution of power decided by said distribution deciding means.

40. The system according to claim 39, wherein said distribution deciding means decides the distribution of power to each device when the device is connected to said power source line.

41. The system according to claim 39, wherein said distribution deciding means decides the distribution of power to each device when power is introduced to the device, which has been connected to said power source line.

42. A power control system for supplying power to a plurality of devices interconnected on a power source line, comprising:
- first multiplexing means for multiplexing power information in each device onto said power source line;
- distribution deciding means for deciding distribution of power to each of said plurality of devices based upon the power information multiplexed by said first multiplexing means; and
- mode control means for controlling a power consumption mode of each device in accordance with the distribution of power decided by said distribution deciding means.

43. The system according to claim 42, further comprising second multiplexing means for multiplexing a power control signal, which is based upon the distribution of power decided by said distribution deciding means, onto said power source line;
said mode control means having means for controlling the power consumption mode of each device based upon the power control signal.

44. The system according to claim 42, wherein said distribution deciding means decides the distribution of power to each device when the device is connected to said power source line.

45. The system according to claim 42, wherein said distribution deciding means decides the distribution of power to each device when power is introduced to the device, which has been connected to said power source line.

46. A power control method in a system to which a plurality of devices are connected by connecting means for transferring data and supplying power, comprising:
- supplying power to a prescribed device among the plurality of devices;
- multiplexing power information in each device onto said connecting means;
- deciding distribution of power to each of said plurality of devices based upon the multiplexed power information in each device; and
- supplying power from said prescribed device to the other devices, which are connected via the connecting means, in accordance with the decided distribution of power.

47. A recording medium on which has been recorded program code for power processing in a system to which a plurality of devices are connected by connecting means for transferring data and supplying power, said program code comprising:
- code for supplying power to a prescribed device among the plurality of devices;
- code for multiplexing power information in each device onto said connecting means;
- code for deciding distribution of power to each of said plurality of devices based upon the multiplexed power information in each device; and
- code for supplying power from said prescribed device to the other devices, which are connected via the connecting means, in accordance with the decided distribution of power.

48. A power control method for supplying power to a plurality of devices interconnected on a power source line, comprising:
- multiplexing power information in each device onto said power source line;
- deciding distribution of power to each of said plurality of devices based upon the multiplexed power information; and
- controlling a power consumption mode of each device in accordance with the decided distribution of power.

49. A recording medium on which has been recorded program code for power control processing for supplying power to a plurality of devices interconnected on a power source line, said program code comprising:
- code for multiplexing power information in each device onto said power source line;
- code for deciding distribution of power to each of said plurality of devices based upon the multiplexed power information; and
- code for controlling a power consumption mode of each device in accordance with the decided distribution of power.

50. A power control system, comprising:
- device connecting unit for connecting a plurality of devices for transferring data and supplying power between said connected plurality of devices:
- distribution deciding unit for deciding distribution of power to each of said plurality of devices based upon power information in each device when a predetermined signal is outputted by a software; and
- mode controller for controlling a power consumption mode of each device in accordance with the distribution of power decided by said distribution deciding unit,
- wherein said predetermined signal is outputted based upon the schedule of said software.

51. A power control system for supplying power to a plurality of devices interconnected on a power source line, comprising:

first multiplexer for multiplexing current drain information in said plurality of devices onto said power source line;

distribution deciding unit for deciding distribution of current to each device based upon the current drain information multiplexed by said first multiplexer;

second multiplexer for multiplexing a current control signal, which is based upon the distribution of current decided by said distribution deciding unit, onto said power source line; and current controller for controlling current supplied, to each device, based upon the current control signal multiplexed by said second multiplexer.

52. The system according to claim 51, wherein in a case where current drain of each device has changed by more than a predetermined amount, said first multiplexer multiplexes current drain information indicative of the changed current drain onto said power source line; and said distribution deciding unit decides distribution of current to each device based upon this current drain information.

53. The system according to claim 52, wherein the predetermined amount is decided in dependence upon current drain of each device.

54. The system according to claim 51, wherein said power source line comprises a plurality of channels;

said distribution deciding unit decides, on a per-channel basis, distribution of current to each connected device; and said current controller controls the current, supplied to each device, on a per-channel basis in accordance with the distribution of current decided by said distribution deciding unit.

55. The system according to claim 54, wherein said distribution deciding unit judges status of connection of devices in each channel based upon the current drain of each channel.

56. The system according to claim 51, wherein said plurality of devices include an adapter capable of connecting another device that is incompatible with this power control system.

57. The system according to claim 56, wherein said adapter has notification unit for giving notification of presently prevailing conditions under which power is being supplied.

58. A power control system to which a plurality of devices are connected by connecting unit for transferring data and supplying power, comprising:

power-source connecting unit for connecting a prescribed device among the plurality of devices to a power source;

multiplexer for multiplexing power information in each device onto said connecting unit;

distribution deciding unit for deciding distribution of power to each of said plurality of devices based upon the power information multiplexed by said multiplexer; and power controller for supplying power from said prescribed device to the other devices, which are connected via the connecting unit, in accordance with the distribution of power decided by said distribution deciding unit.

59. The system according to claim 58, wherein said distribution deciding unit decides the distribution of power to each device when the device is connected to said power source line.

60. The system according to claim 58, wherein said distribution deciding unit decides the distribution of power to each device when power is introduced to the device, which has been connected to said power source line.

61. A power control system for supplying power to a plurality of devices interconnected on a power source line, comprising:

first multiplexer for multiplexing power information in each device onto said power source line;

distribution deciding unit for deciding distribution of power to each of said plurality of devices based upon the power information multiplexed by said first multiplexer; and mode controller for controlling a power consumption mode of each device in accordance with the distribution of power decided by said distribution deciding unit.

62. The system according to claim 61, further comprising a second multiplexer for multiplexing a power control signal, which is based upon the distribution of power decided by said distribution deciding unit, onto said power source line;

said mode controller having a unit for controlling the power consumption mode of each device based upon the power control signal.

63. The system according to claim 61, wherein said distribution deciding unit decides the distribution of power to each device when the device is connected to said power source line.

64. The system according to claim 61, wherein said distribution deciding unit decides the distribution of power to each device when power is introduced to the device, which has been connected to said power source line.

65. A power control method in a system to which a plurality of devices are connected by a connecting unit for transferring data and supplying power, comprising:

supplying power to a prescribed device among the plurality of devices;

multiplexing power information in each device onto said connecting unit;

deciding distribution of power to each of said plurality of devices based upon the multiplexed power information in each device; and supplying power from said prescribed device to the other devices, which are connected via the connecting unit, in accordance with the decided distribution of power.

66. A recording medium on which has been recorded program code for power processing in a system to which a plurality of devices are connected by a connecting unit for transferring data and supplying power, said program code comprising:

code for supplying power to a prescribed device among the plurality of devices;

code for multiplexing power information in each device onto said connecting unit;

code for deciding distribution of power to each of said plurality of devices based upon the multiplexed power information in each device; and code for supplying power from said prescribed device to the other devices, which are connected via the connecting unit, in accordance with the decided distribution of power.

* * * * *

UNITED STATES PATENT AND TRADEMARK OFFICE
CERTIFICATE OF CORRECTION

PATENT NO. : 6,526,516 B1 Page 1 of 1
DATED : February 25, 2003
INVENTOR(S) : Hisashi Ishikawa et al.

It is certified that error appears in the above-identified patent and that said Letters Patent is hereby corrected as shown below:

Column 6,
Line 21, "connections-by" should read -- connections by --

Column 10,
Line 23. "(not-shown)" should read -- (not shown) --

Column 11,
Line 5, "signal.from" should read -- signal from --

Column 16,
Line 61, "of-a" should read -- of a --

Column 20,
Line 17, "busreset" should read -- bus-reset --

Column 21,
Line 22, "is. performed" should read -- is performed --

Column 22,
Line 33, "been-determined," should read -- been determined, --

Column 25,
Line 1, "the .CSP" should read -- the CSP --

Signed and Sealed this

Fourth Day of November, 2003

JAMES E. ROGAN
*Director of the United States Patent and Trademark Office*